Oct. 25, 1955 R. F. STEHLIK 2,721,901

TELEPHONE SYSTEMS INCORPORATING BANK-POSITION MARKING IN SWITCHING STAGES

Filed Oct. 16, 1951 8 Sheets-Sheet 1

INVENTOR.
RUDOLPH F. STEHLIK

BY Chas. W. Candy

ATTORNEY

Oct. 25, 1955 R. F. STEHLIK 2,721,901

TELEPHONE SYSTEMS INCORPORATING BANK-POSITION MARKING IN SWITCHING STAGES

Filed Oct. 16, 1951 8 Sheets-Sheet 2

INVENTOR.
RUDOLPH F. STEHLIK

BY [signature]

ATTORNEY

INVENTOR.
RUDOLPH F. STEHLIK
BY
Chas. W. Candy
ATTORNEY

Oct. 25, 1955 R. F. STEHLIK 2,721,901

TELEPHONE SYSTEMS INCORPORATING BANK-POSITION MARKING IN SWITCHING STAGES

Filed Oct. 16, 1951 8 Sheets-Sheet 4

INVENTOR.
RUDOLPH F. STEHLIK

BY [signature]

ATTORNEY

Oct. 25, 1955 R. F. STEHLIK 2,721,901

TELEPHONE SYSTEMS INCORPORATING BANK-POSITION MARKING IN SWITCHING STAGES

Filed Oct. 16, 1951 8 Sheets-Sheet 5

INVENTOR.
RUDOLPH F. STEHLIK

BY

ATTORNEY

INVENTOR.
RUDOLPH F. STEHLIK
BY
ATTORNEY

Oct. 25, 1955 R. F. STEHLIK 2,721,901

TELEPHONE SYSTEMS INCORPORATING BANK-POSITION MARKING IN SWITCHING STAGES

Filed Oct. 16, 1951 8 Sheets-Sheet 7

INVENTOR.
RUDOLPH F. STEHLIK

BY [signature]

ATTORNEY

INVENTOR.
RUDOLPH F. STEHLIK
BY
Chas. W. Candy
ATTORNEY

United States Patent Office 2,721,901

Patented Oct. 25, 1955

2,721,901

TELEPHONE SYSTEMS INCORPORATING BANK-POSITION MARKING IN SWITCHING STAGES

Rudolph Frank Stehlik, Antwerp, Belgium, assignor to Automatic Electric Laboratories, Inc., Chicago, Ill., a corporation of Delaware Application October 16, 1951, Serial No. 251,481

29 Claims. (Cl. 179—18)

This invention relates in general to telephone systems, and more particularly to automatic telephone systems employing switches of the single-motion rotary type wherein one operating magnet is controlled to always step the wipers of the switch forward in the one direction.

It is an object of the invention to provide in a telephone system of the character described, new and novel circuit means for accomplishing the various telephone connections.

Another object of the invention is to provide in a telephone system of the character described, a simplified and inexpensive switch train wherein the connecting switches are not restored to normal, or fixed, home positions upon the abandonment of a telephone connection, but are retained in the established positions with the respective wipers remaining on the respective occupied bank contacts. The term "connecting switch" as used herein denotes a switch over whose switching elements the talking circuit extends.

A further object of the invention is to provide in a telephone system of the character described, new and novel means for translating received series of impulses, dialed by a calling station in the telephone system and representing a called station of the telephone system, into corresponding marking-control currents according to the values of the respective series of dialed impulses, and for "marking" particular positions of respective selected connecting switches according to the values of the respective marking-control currents, preparatory to the so marked connecting switches being caused to hunt for and seize the respective marked positions thereby to connect the calling station to the called station.

A still further object of the invention is to provide in a telephone system of the character described, new and novel marking means whereby particular positions of respective connecting switches in a called office are correspondingly "marked" from the calling office without requiring the repetition of impulses or selecting signals from the calling office.

A feature of the invention is the provision of a novel register which records received series of dialed impulses by means of an In-Dialing distributor, and which provides marking-control currents corresponding respectively to the recorded series of impulses and controlled by an Out-Marking distributor, for successively marking selected connecting switches to direct such connecting switches in the establishment of a desired connection. The register is seized at the calling office responsive to the initiation of a call and extends the required marking-control currents to all the selecting stages, whether within the calling office or within a called office in a multi-office system.

Another feature of the invention resides in the novel manner in which an occupied register and an occupied connecting switch, or switches, as the case may be, are freed from an attempted connection for use on future calls, in the event that a seized connecting switch on the attempted connection fails to find an available outlet.

Under such an unavailable outlet condition, busy tone is returned to the calling station.

A further feature of the invention concerns the employment of an electronic tube in association with the impulse recording register. The electronic tube is "flashed" to control in a novel manner successive applications of the marking-control currents to the respective selected connecting switches, thereby to cause the "marking" of the required positions of the respective selected connecting switches in the establishing of a desired connection.

There are other objects and features of the invention having to do for the most part with the circuit details necessary to carry out the objects and features above enumerated.

The various objects and features of the invention will be understood best from a perusal of the following detailed description of the drawings comprising Figures 1 to 12, inclusive, which show by means of the usual circuit diagrams a sufficient amount of apparatus to enable the invention to be described and understood.

Figure 3–A shows a telephone station connected in multiple to the respective bank contact sets in a group of line-finder switches and a group of the connector switches in the main office.

Figure 3–B shows a second telephone station connected in multiple to the respective bank contact sets in the mentioned group of line-finder switches and the mentioned group of the connector switches in the main office.

Figures 3A, 3B, 4, 5, 6:
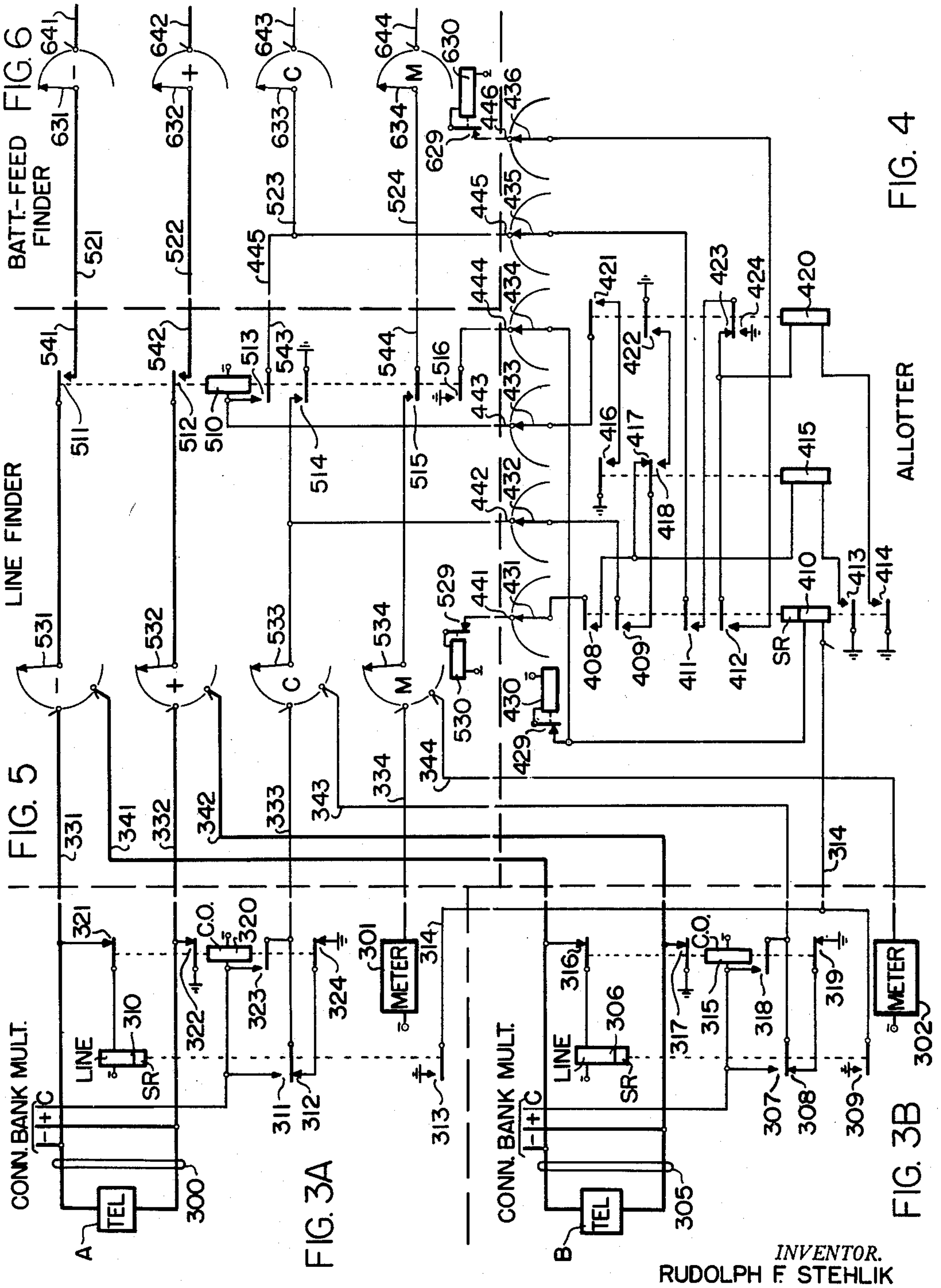

Figure 4 shows the relays and switch of the allotter which assigns line-finder switches to find calling lines.

Figure 5 shows one of the line-finder switches equipped with wipers and associated bank contact sets.

Figure 6 shows one of the battery-feed finder switches which is directly associated with one of the line-finder switches.

Figure 7:
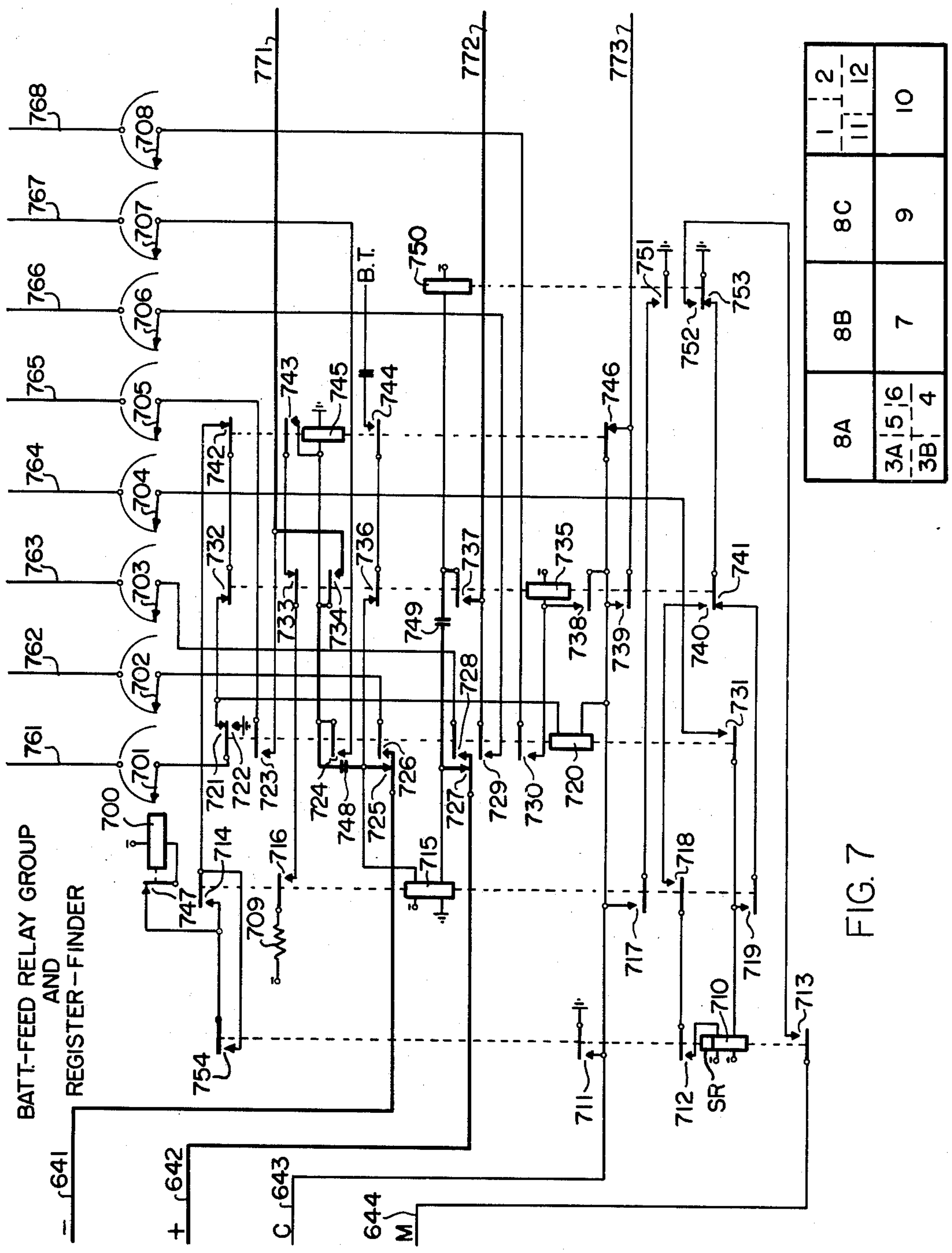

Figure 7 shows one of the combined battery-feed relay-group and register-finder switches equipped with wipers and associated bank contact sets.

Figure 8C:
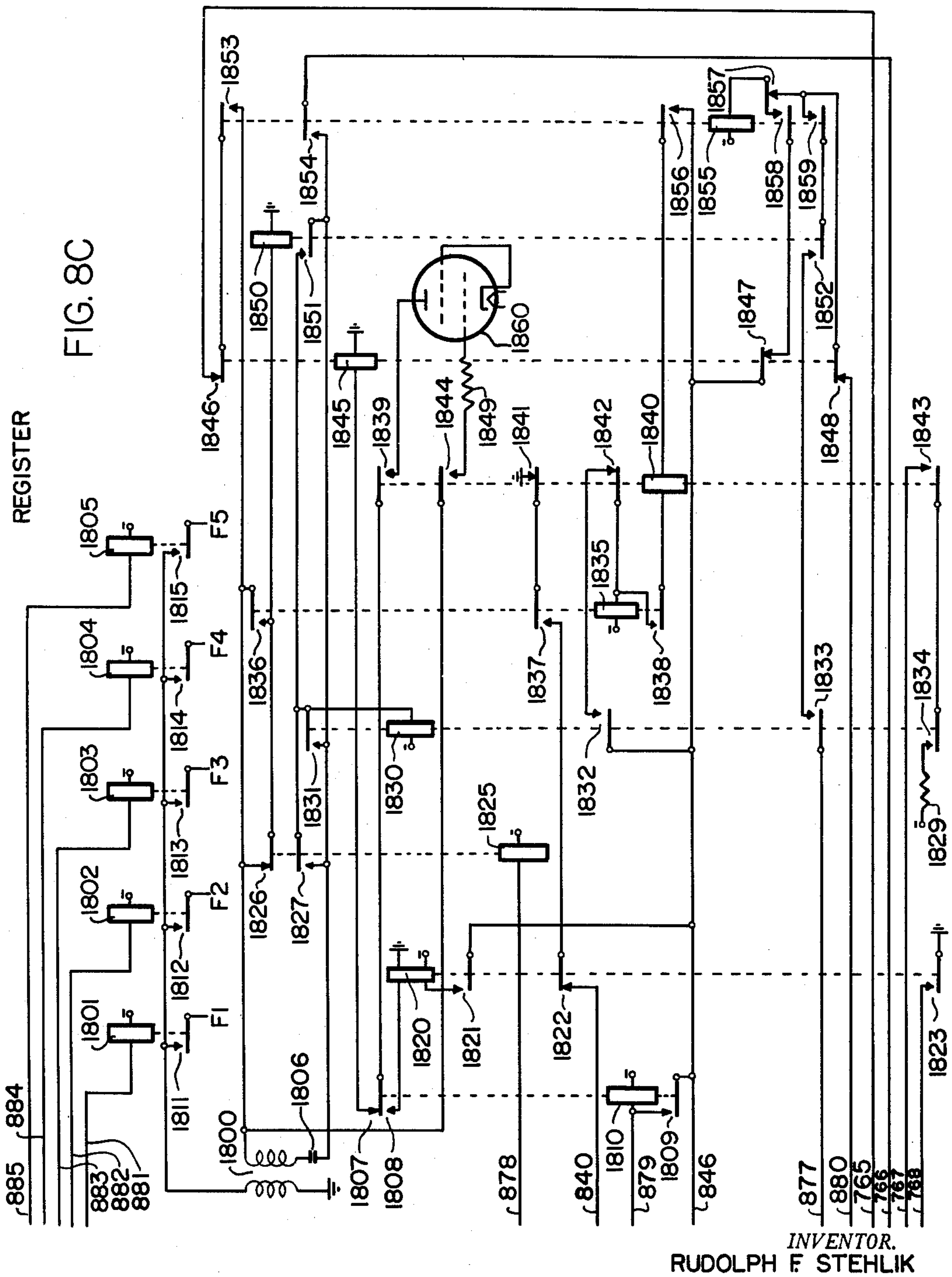
Figure 8B:
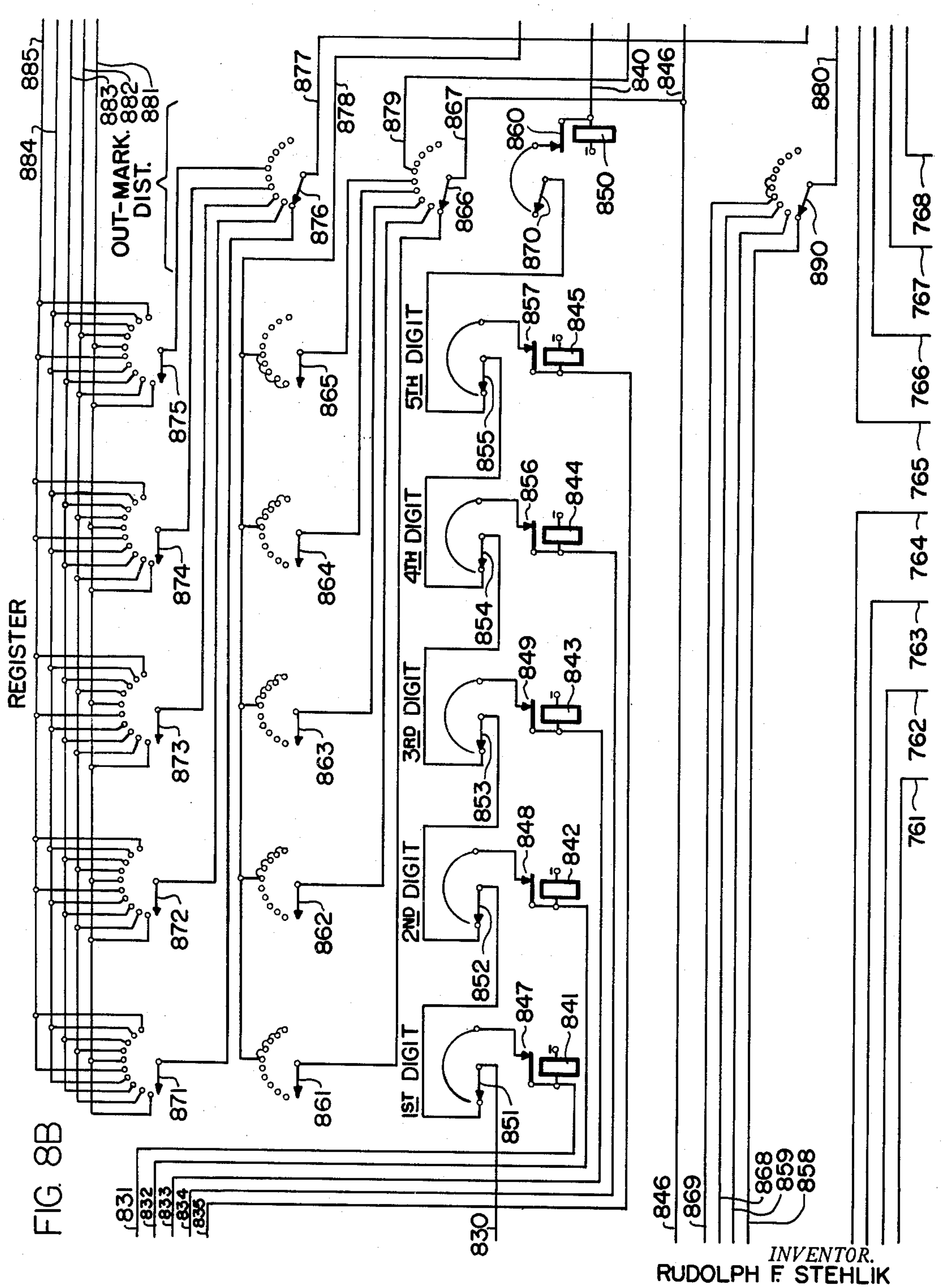
Figure 8A:
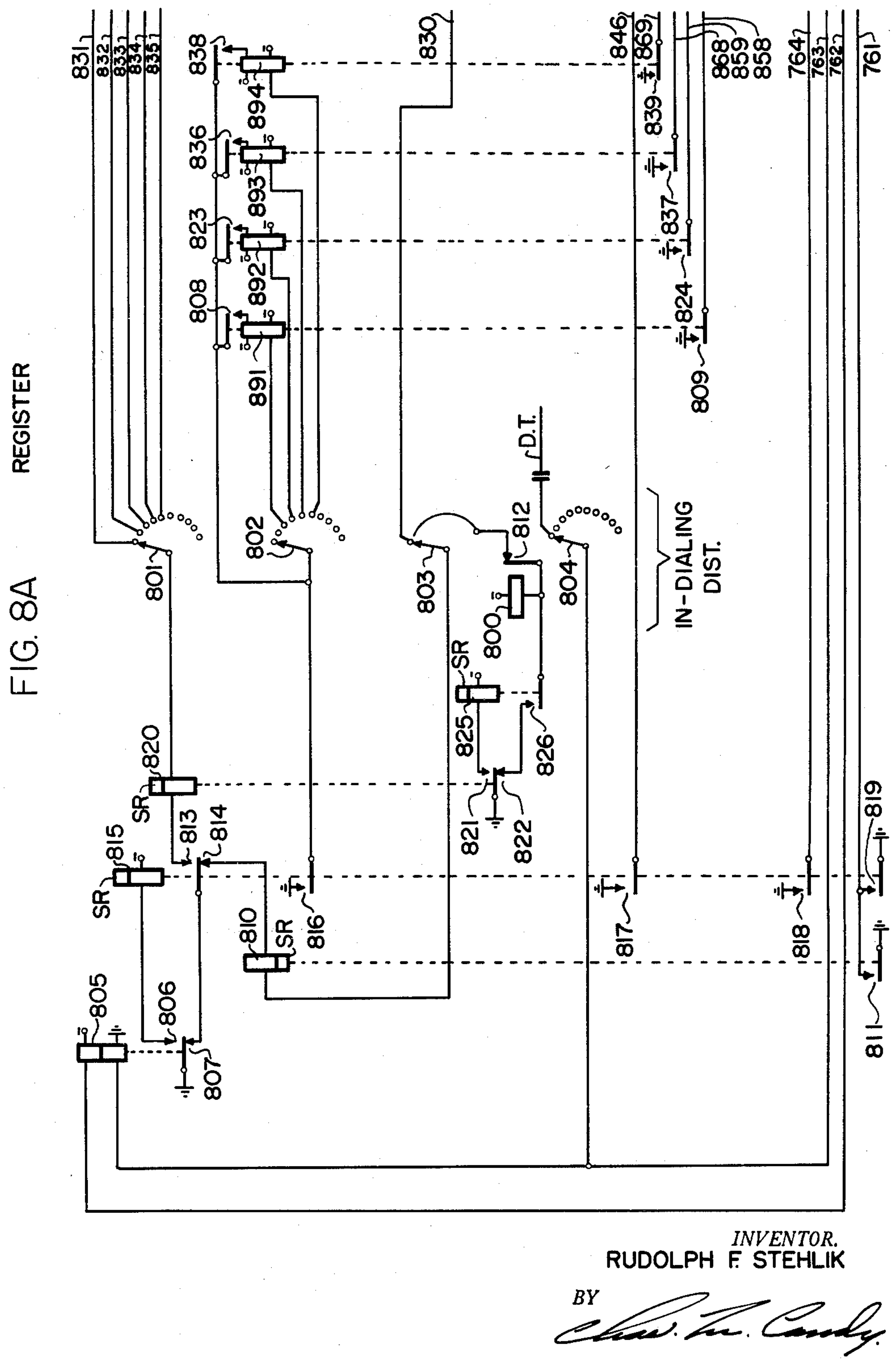

Figures 8–A, 8–B and 8–C show one of the registers adapted for receiving and storing dialed impulses from a calling station and for correspondingly marking the bank contact groups of the related selector and connector switches.

Figure 9:
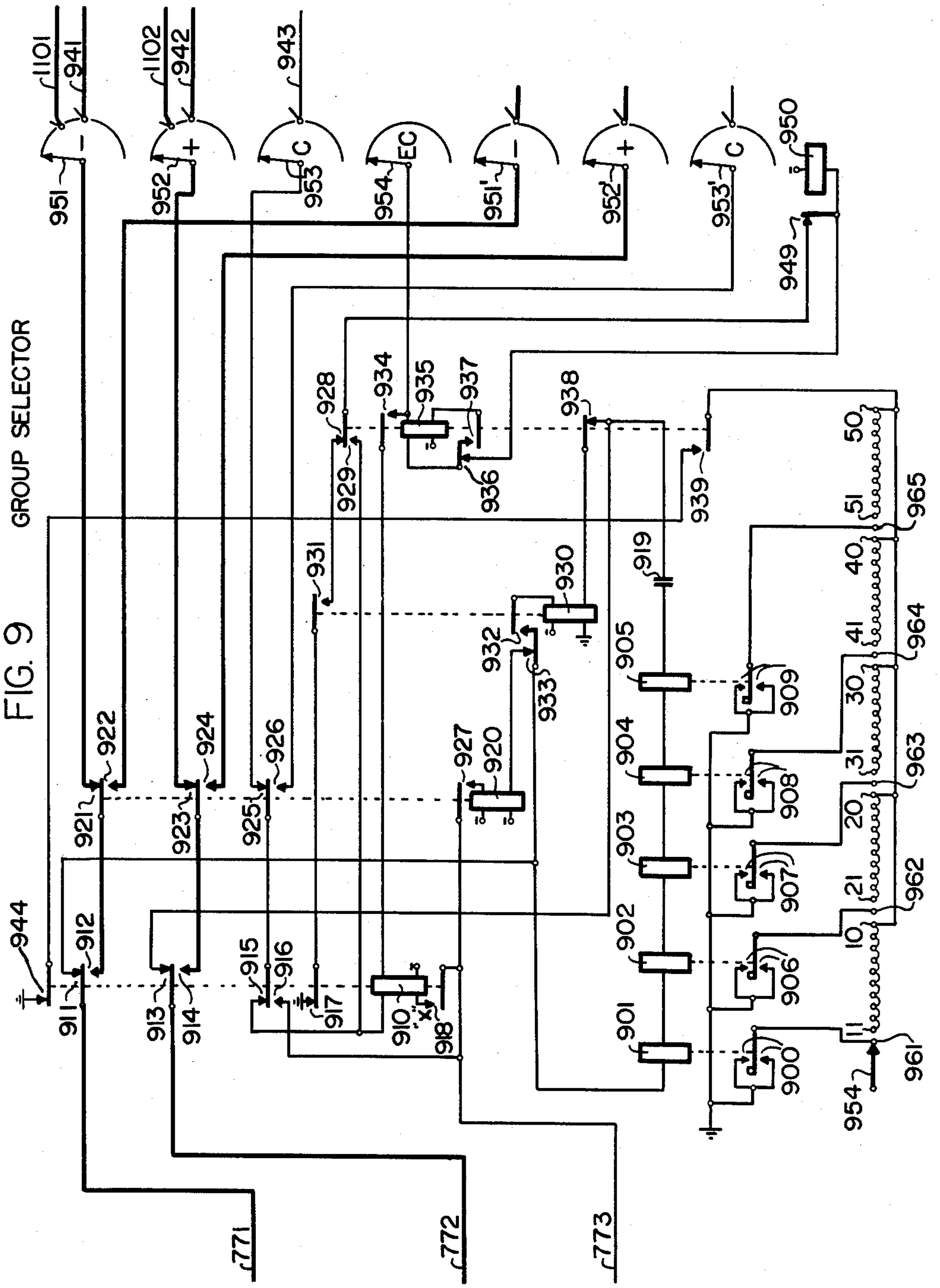

Figure 9 shows a group selector switch equipped with two sets of wipers and associated bank contact sets and, in addition, an extra-control wiper and associated bank contact set.

Figure 10:
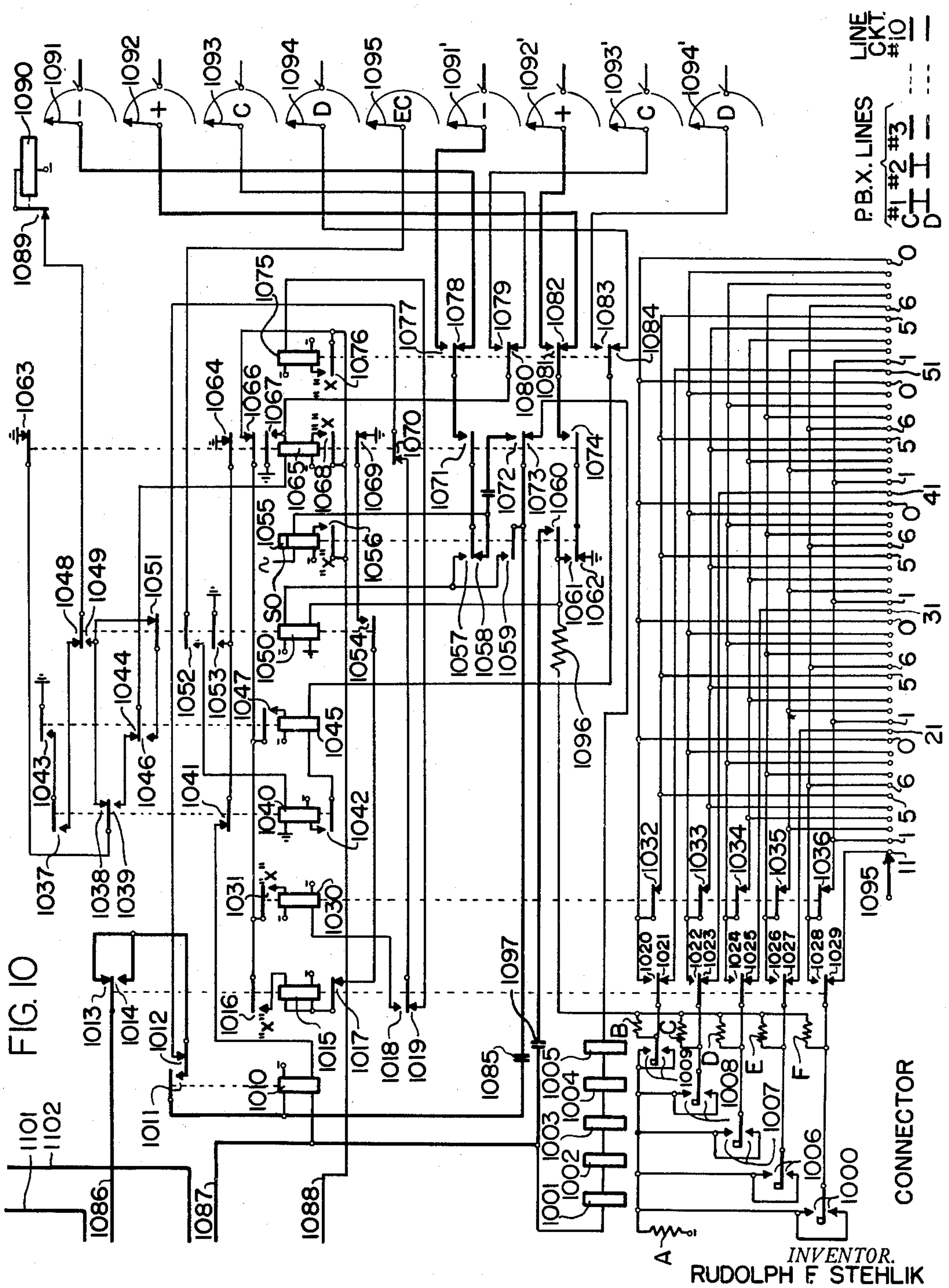

Figure 10 shows a connector switch equipped with two sets of wipers and associated bank contact sets and, in addition, an extra-control wiper and associated bank contact set.

Figure 11:
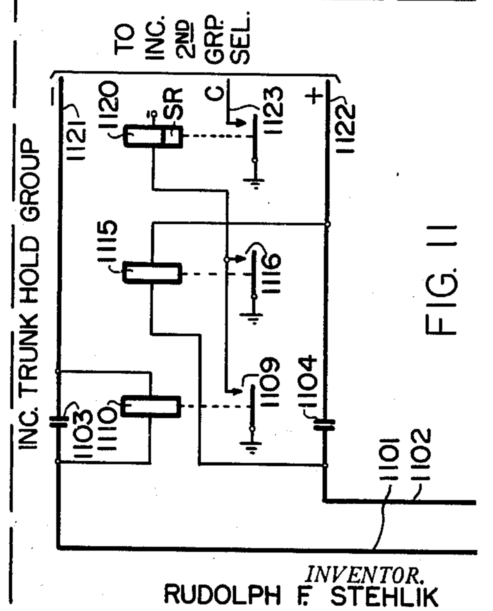

Figure 11 shows one of the incoming trunk-holding groups located in the branch office for terminating one of the trunks connecting the main office with the branch office.

Figure 12:
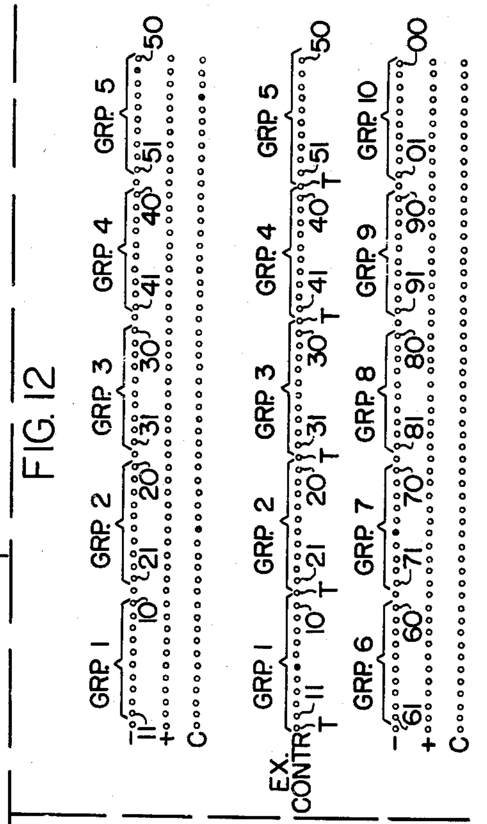

Figure 12 shows the numbering and grouping of the bank contact sets associated with one of the group selector switches.

A table is inserted at the lower right-hand corner of Figure 7 to indicate how the various figures of the drawings can be assembled to form a complete circuit diagram of the telephone system.

Figures 1, 2:
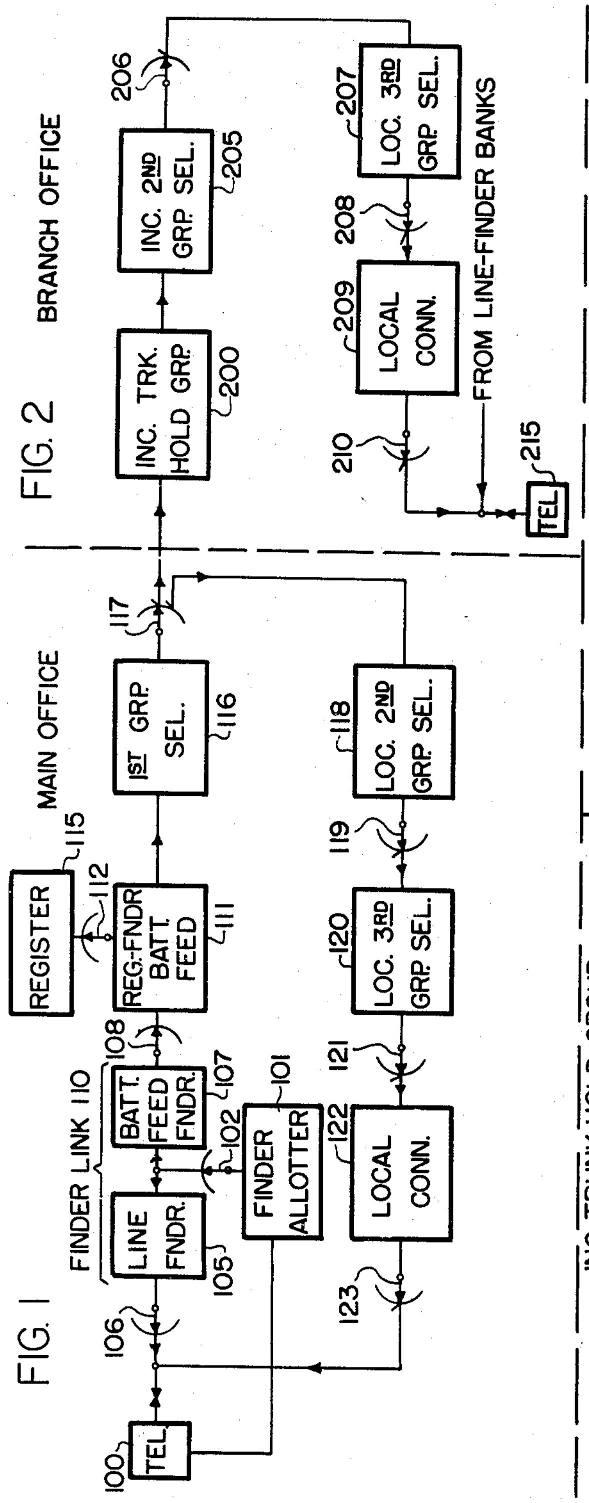
Figure 1 is a simple one-line diagram illustrating the elements of the invention as applied to the main office of a multi-office 100,000 station system.
Figure 2 is a simple one-line diagram illustrating the elements of the invention as applied to the incoming trunking service of a branch office associated with the mentioned main office.

Referring now to Figure 1, the main office telephone exchange shown therein consists essentially of the telephone stations, such as 100, finder links, such as 110, finder allotter, such as 101—102, battery-feed relay groups and register finders, such as 111—112, registers, such as 115, first group selectors, such as 116—117, local second group selectors, such as 118—119, local third group selectors, such as 120—121, and local connectors, such as 122—123. Each finder link 110 comprises a line-finder, such as 105—106 and a battery-feed relay group finder, such as 107—108. All of these elements are interconnected as shown in Figure 1 to form a main office trunking arrangement. In addition, the first group selectors, such as 116—117, have access to trunks leading to incoming trunk holding groups, such as 200, in the branch office in order that calls may be extended from the main office to stations, such as 215, associated with the branch office.

Referring next to Figure 2, only sufficient elements are included therein to illustrate the completion of an outgoing call from a station, such as 100, in the main office to a station, such as 215, in the branch office. The elements in the branch office consist essentially of an incoming trunk holding group, such as 200, an incoming second group selector, such as 205—206, a local third group selector, such as 207—208, and a local connector, such as 209—210. It should be understood, however, that the branch office is also equipped with switching elements for completing local calls between stations directly associated with the branch office, in a manner similar to that shown in Figure 1 for the main office—the local switching elements being omitted in Figure 2 to simplify the drawing.

It should be further understood that this invention is not limited to a one main office and a one branch office telephone system, as any desired number of and arrangement of offices may be included. Also, the telephone system may be of smaller or larger capacity by the elimination of or introduction of appropriate ranks of intermediate group selectors and corresponding changes in the register.

The line circuit connecting station 100 (Figure 1) to the banks of line-finder 105—106 is wired as shown in Figure 3–A: the finder-allotter 101 as shown in Figure 4: the line-finder 105—106 as shown in Figure 5: the battery-feed relay-group-finder 107—108 as shown in Figure 6: the combined battery-feed relay group and register-finder 111—112 as shown in Figure 7: the register 115 as shown in Figures 8–A, 8–B and 8–C: the first group selector 116—117, the local second group selector 118—119, the local third group selector 120—121, the incoming second group selector 205—206 and the local third group selector 207—208 each as shown in Figure 9; and the local connectors 122—123 and 209—210 each as shown in Figure 10.

Referring now to Figures 3–A and 3–B, a telephone substation is associated with each of the telephone lines in the system, the substation "A" (Figure 3–A) and "B" (Figure 3–B) being respectively associated with telephone lines 300 and 305. Each of the substations is provided with a telephone instrument, a dial mechanism, and a ringer. Each telephone line includes a line relay and a cut-off relay, these relays in line 300 being respectively indicated at 310 and 320, and in line 305 at 306 and 315. Each line is equipped with a message-register meter for registering the number of calls made from the related station.

The finder switches of the finder links, of the allotter switch and of the combined battery-feed relay groups and register finders are mechanically similar to well-known step-by-step rotary switches having no normal, or home, positions, while the circuits thereof have been altered in accordance with the present invention.

The group selector shown in Figure 9 is mechanically similar to the line-finder switch shown in Figure 5 with the general difference that it is directively controlled to select a marked group of bank contacts, and then automatically hunts in that particular group of bank contacts for a free outlet. Each selector switch is fitted with two sets of trunk wipers, a wiper-selecting relay, one "extra-control" wiper, two sets of trunk banks and one "extra-control" bank. The two sets of trunk banks each comprise three rows of contacts designated "—", "+" and "C" respectively. The extra-control bank comprises one row of contacts designated "extra-control," and is located between the two sets of trunk banks. A typical arrangement and grouping of the seven rows of contacts is shown in Figure 12, it being appreciated that there are no individual extra-control contacts for the lower trunk groups. The extra-control contacts for the upper trunk groups also respectively serve for the lower trunk group since the contact sets of the lower trunk groups are in alignment with the contact sets of the upper trunk groups and, as the wipers for the upper trunk groups are passing over the contacts of the upper trunk groups, the wipers for the lower trunk groups are passing over the contacts of the lower trunk groups. The wiper-selecting relay of the group selector associates the control bank contacts of the upper trunk groups or the control bank contacts of the lower trunk group with the contacts of the extra-control bank, as circumstances dictate.

The connector switch shown in Figure 10 is mechanically similar to the line-finder switch shown in Figure 5 with the general difference that it is directively controlled to select a marked group of bank contacts and then directively controlled to find a marked contact in the group. In a manner similar to that used for the group selectors, each connector is fitted with two sets of line wipers, a wiper-selecting relay, one "extra-control" wiper two sets of line banks and one "extra-control" bank. The two sets of line banks each comprise four rows of contacts designated "—," "+," "C" and "D" respectively. The extra-control bank comprises one row of contacts designated "extra-control," and is located between the two sets of line banks. The arrangement and grouping of the nine rows of contacts for the connector would be similiar to that shown in Figure 12 and described in the preceding paragraph concerning the group selector and, therefore, it is considered unnecessary to detail the nine rows of bank contacts for the connector. The grouping and designation of the contacts for the extra-control bank, however, is shown at the bottom of Figure 10. It should be understood that while the connector disclosed in Figure 10 is of the "P. B. X" type, the present invention is equally applicable to any of the many well-known types of connector switches.

The group selectors (Figure 9) and the connectors (Figure 10), in addition to being equipped with conventional type relays, are each fitted with five sets of tuned vibrating reed contacts. In the particular arrangement shown in Figures 9 and 10, these vibrating reed contacts are controlled by related individual magnets connected in series primarily for the purposes of disclosure. It should be understood at this time, however, that the five sets of vibrating reed contacts need not be controlled by individual magnets, or even be magnet controlled, as any suitable type of tuned vibrating reed contact can be employed equally as well.

The switches shown in the register disclosed in Figures 8–A, 8–B and 8–C are mechanically similar to the line-finder switch shown in Figure 5, but instead of hunting for a marked potential as the line-finder does, these switches are directively controlled from a normal, or home, position by impulses. The five alternating currents F–1, F–2, F–3, F–4, F–5 associated respectively with the five magnets 1801, 1802, 1803, 1804, 1805 (Figure 8–C) of the register can be applied from any desired sources which provide five different frequencies of alternating currents, preferably harmonic in nature.

It should be understood at this time that while the embodiment of the present invention disclosed and described in this specification includes switches having fixed numbers of bank contacts, the invention is not limited to the particular forms shown but may utilize other bank-capacity switches equally as well.

It should be further understood that while a plurality of battery connections are shown in the drawings, they are preferably the same battery in the respective telephone office. Also in order to simplify the drawings further, relay contacts for starting and stopping the operation of alternating current generating equipment have been omitted. An "X" contact shown in association with a relay armature is a contact that makes or breaks before any other contacts of the particular relay are opened or closed, thus characterizing the relay as a two-step relay.

Having described the equipment and apparatus, a detailed description of the operation will now be given.

LOCAL CALL IN MAIN OFFICE

Briefly, calls are completed in the following manner: The person at the calling station lifts the handset from the cradle and, after hearing conventional dial tone, dials the number of the desired station. If the called station is in use, the calling person receives a busy tone. If the called station is not busy, the called station is rung automatically and intermittently.

In order to describe a call in detail, it is assumed that station "A" (Figure 3–A) desires to call station "B" (Figure 3–B), and that the wipers 431—436 of the allotter (Figure 4) are standing on the respective bank contacts connected to the finder link comprising Figures 5 and 6. It should be understood at this time that each link in the main office comprises a line-finder switch, such as Figure 5, directly connected to a battery-feed relay-group finder, such as Figure 6, by means of conductors, such as 541, 542, 543 and 544. In connection with the perusal of the following circuit explanation, it is helpful to keep the trunking diagrams shown in Figures 1 and 2 in mind, since all of the different group selectors are wired to the same circuit drawing, i. e., Figure 9.

(*a*) *Finding the calling station*

Responsive to the lifting of the handset at station "A," a circuit for operating line relay 310 is completed from ground, contact 322, lower conductor of line 300, telephone at "A," upper conductor of line 300, contact 321, winding of line relay 310 to battery. At contact 311, relay 310 "marks" station "A" as calling in the bank of the line-finder switch associated with wiper 533, by connecting battery thereto through the winding of cut-off relay 320. At contact 313, relay 310 completes a circuit to "start" relay 410 (Figure 4) by way of conductor 314, winding of relay 410, interrupter contact 429, winding of motor magnet 430 to battery, causing relay 410 to operate. Magnet 430, however, does not operate at this time because of the high resistance value of relay 410. Relay 410 is of the slow-to-release type in order not to restore during momentary interruption of its circuit.

At contact 408, relay 410 connects one terminal of the winding of relay 415 to wiper 431: at contact 409, connects said one terminal of relay 415 to wiper 432 by way of contact 417: at contact 411, connects one terminal of the winding of relay 420 to wiper 435 by way of contact 423: at contact 412, connects said one terminal of relay 420 to wiper 436: at contact 413, connects ground potential to the other terminal of relay 415: and, at contact 414, connects ground potential to the other terminal of relay 420. As a consequence of these connections, a circuit is completed from ground, contact 413, winding of relay 415, contact 408, wiper 431, bank contact, conductor 441, interrupter contact 529, winding of motor magnet 530 to battery. Magnet 530 cannot operate over this circuit due to the high resistance value of the winding of relay 415. Ground potential is also extended through contact 413 to wiper 533 of the line-finder by way of the winding of relay 415, contacts 417, 409, wiper 432, bank contact and conductor 442. Assuming further that wipers 531—534 of the line-finder are standing on the bank contacts of a line circuit not in use, such as 305, then ground is extended through contacts 319, 308 (Figure 3–B) over conductors 343, bank contact, wiper 533, conductor 442, bank contact, wiper 432, and contacts 409, 417 to the upper terminal of relay 415. Relay 415 is thus effectively shunted and cannot operate. The just traced ground extending back over conductor 442, wiper 432 is further extended through contacts 409, 417, 408, wiper 431, bank contact, conductor 441, interrupter contact 529, winding of magnet 530 to battery. Magnet 530 accordingly self-drives wipers 531—534 of the line-finder in well-known manner as long as wiper 533 finds ground potential on the related bank contacts of tested line circuits.

When control wiper 533 of the line-finder connects with the bank contact associated with conductor 333 of the calling station "A," battery extended through winding of cut-off relay 320, contact 311, conductor 333, bank contact wiper 533, conductor 442, bank contact, wiper 432, contacts 409, 417, 408, wiper 431, bank contact, conductor 444, interrupter contact 529 to the winding of magnet 530, shunts down magnet 530, thereby stopping wipers 531—534 on the related bank contacts of line 300. The battery extended back over conductor 442, bank contact, wiper 432 is also extended through contacts 409, 417 to the upper terminals of relay 415, causing both cut-off relay 320 of line 300 and relay 415 of the allotter to operate.

Cut-off relay 320, upon operating, disconnects line relay 310 from line 300 at contacts 321 and 322, but line relay 310 is of the slow-to-release type and remains in the operated position for the time being. Relay 415 of the allotter, upon operating, opens the energizing circuit of cut-off relay 320 at contact 417, causing cut-off relay 320 to restore. Cut-off relay 320, upon restoring, reconnects line relay 310 across line 300, thereby re-energizing line relay 310 before line relay 310 has had sufficient time to restore. Ground to relay 410 of the allotter is, therefore, maintained at contact 313. As contact 417 is opened by the operation of relay 415, the previously established circuit through magnet 530 to the winding of relay 415 becomes effective to maintain relay 415 in the operated position, but magnet 530 cannot re-operate over this circuit. The continued operation of relay 415 causes cut-off relay 320 to remain in the restored position.

(*b*) *Finding a free battery-feed relay group*

The operation of "start" relay 410 responsive to the initiation of the call at station "A" also completes a circuit from ground, contact 414, winding of relay 420, contact 412, wiper 436, bank contact, conductor 446, interrupter contact 629, winding of motor magnet 630 of the battery-feed relay-group finder (Figure 6) to battery. Magnet 630, however, cannot operate over this circuit due to the high resistance value of the winding of relay 420. Ground is also extended through contact 414 to wiper 633 of the battery-feed relay-group finder by way of the winding of relay 420, contacts 423, 411, wiper 435, bank contact and conductors 445, 523. Assuming now that wipers 631—634 of the battery-feed relay-group finder are standing on the bank contacts of a battery-feed relay group in prior use, such as Figure 7, then ground potential is returned back over conductor 643 to wiper 633 and further extended by way of conductors 523, 445, bank contact, wiper 435, contacts 411, 423, to the upper terminal of relay 420. Relay 420 is thus effectively shunted and cannot operate.

The just described ground extending back over conductors 523, 445, bank contact, wiper 435, is also extended through contacts 411, 423, 412, wiper 436, bank contact, conductor 446, interrupter contact 629, winding of magnet 630 to battery. Magnet 630 accordingly self-drives wipers 631—634 in well-known manner as long as wiper 633 finds ground potential on the related bank contacts of tested battery-feed groups.

When control wiper 633 connects with the bank contact associated with conductor 643 of an idle battery-feed relay group, for example the relay group shown in Figure 7, then there is no ground potential returned back over conductor 643 to wiper 633 and, consequently, relay 420 operates over the previously traced circuit through magnet 630, but magnet 630 cannot re-operate over this circuit. The wipers 631—634 of the battery-feed relay-group finder are, therefore, maintained on the respective bank contacts connected to conductors 641—644 of the selected idle battery-feed relay group. At contact 424, operated relay 420 extends ground potential by way of contact 411, wiper 435, conductors 445, 523, wiper 633, bank contact to conductor 643 of the selected idle battery-feed relay group to guard the selected idle battery-feed relay group against other possible seizure.

The operation of relay 420 also extends ground potential by way of contacts 422, 418, 409, wiper 432, bank contact, conductor 442, wiper 533, bank contact, conductor 333, contact 311, winding of cut-off relay 320 to battery, causing cut-off relay 320 to re-operate and lock to ground by way of contact 323. Cut-off relay 320, upon re-operating, again disconnects line relay 310 from line 300 at contacts 321 and 322, but line relay 310 does not restore for a short time interval. Relay 410 of the allotter is, therefore, maintained energized at contact 313 of line relay 310 until line relay 310 finally restores. Relay 410 of the allotter is also of the slow-to-release type and, consequently, remains operated for a further short time interval and thereby maintains its contacts correspondingly closed. The serial slow release times of line relay 310 and allotter relay 410 are sufficient to permit battery-feed relay-group finder (Fgure 7) ample time to select an idle battery-feed relay group and relay 510 of the line-finder (Fgure 5) to switch line 300 through to the selected battery-feed relay group.

*(c) Switching calling station to selected battery-feed relay group*

The operation of relay 420 also extends ground potential through contacts 416, 421, wiper 433, bank contact, conductor 443, winding of switching-through relay 510 to battery, causing relay 510 to operate and lock to ground by way of contact 513, conductor 445, bank contact, wiper 435, and contacts 411 and 424. At contacts 511, 512 and 515, relay 510 switches conductors 331, 332, 334 of line 300 through to conductors 641, 642 and 644 respectively of the selected battery-feed relay group (Figure 7). As a consequence, line relay 715 operates over the loop from calling station "A," and causes ground potential to be returned over conductor 643, in a manner to be subsequently explained, to lock relay 510 independent of the allotter.

At contact 514, relay 510 extends ground potential to wiper 533 to hold cut-off relay 320 in the locked position independent of the allotter. At contact 516, relay 510 extends ground potential by way of conductor 444, bank contact, wiper 434, interrupter contact 429 to the winding of magnet 430 for the purpose of causing the wipers of the allotter to move from the finder link of Figures 5 and 6 to an idle, or free, finder link. The full restoration of line relay 310 of line 300 removes ground potential from the winding of relay 410 of the allotter, thereby freeing the allotter from further control by station "A." Relays 415 and 420 are caused to restore by the movement of the allotter wipers to an idle finder link. Relay 410 fully restores after a short interval and opens contacts 408, 409, 411, 412, 413 and 414, thereby to place the allotter in readiness for the next call.

Should wipers 531—534 of the line finder (Figure 5) have been standing on the bank contacts of line 300 when station "A" initiated the call, there would have been no rotation of the line-finder because battery through the winding of cut-off relay 320 and contact 311 would have been immediately connected to wiper 533. In that case cut-off relay 320 would operate immediately, and magnet 430 of the allotter would be shunted by the battery from the winding of cut-off relay 320 and could not operate.

After the operation and locking of switching-through relay 510 of the line finder to ground potential over wiper 435 and conductor 445, line 300 of station "A" is extended to line relay 715 of the selected battery-feed relay group (Figure 7) by way of conductors 641—642, contacts 725—727, and line relay 715 operates over the loop through station "A." At contact 719, relay 715 completes an obvious circuit to the lower winding of relay 710, causing relay 710 to operate. At contact 711, relay 710 extends ground potential over conductor 643, bank contact, wiper 633, conductors 523, 445, contact 513 to the winding of switching-through relay 510 of the line finder to hold relay 510 locked independent of ground potential from the allotter.

*(d) Finding a free register*

Before dial tone is returned to calling station "A" as a signal to commence dialing, an idle register (Figures 8–A, 8–B and 8–C) is selected by the rotary switch associated with the occupied battery-feed relay group of Figure 7, in the immediately following described manner. If the register upon which the finder wipers 701—708 are standing is in prior use, then ground potential is returned over conductor 761. This ground potential is extended through bank contact, wiper 701, contacts 721, 732, 742, 714, interrupter contact 747 to the winding of motor magnet 700. As a consequence, magnet 700 self-drives wipers 701—708 in well-known manner to select an idle register.

Assuming now that the register represented by Figures 8–A, 8–B and 8–C is in a free condition and has been selected by the finder of Figure 7, then wipers 701—708 are respectively connected to conductors 761—768. At this instant there is no ground potential on conductor 761 and, consequently, magnet 700 restores for the last time. Switching-through relay 720 thereupon operates from ground potential on conductor 643, winding of relay 720, contacts 732, 742, 714, interrupter contact 747, winding of magnet 700 to battery, but magnet 700 does not reoperate due to the high resistance value of the winding of relay 720. At contact 722, relay 720 extends ground potential to conductor 761 of the selected register, thereby to guard the selected register against other possible seizure.

At contacts 726—728, relay 720 switches line conductors 641—642 through to line relay 805 of the selected register over conductors 762—763, causing line relay 805 to operate. At contact 806, relay 805 causes hold relay 815 to operate over an obvious circuit. At contact 818, relay 815 extends ground potential to the lower winding of hold relay 710 by way of conductor 764, bank contact, wiper 704 and contact 731 to hold relay 710 operated after line relay 715 has restored due to the opening of contacts 725—727. Hold relay 710 is of the slow-to-release type to insure that it will remain operated as line relay 715 restores and ground potential is received via contact 731. At contact 754, relay 710 provides a multiple circuit for holding relay 720 operated after line relay 715 restores and opens contact 714. At contact 819, relay 815 extends a multiple guarding ground to conductor 761. At contacts 723 and 729, relay 720 switches line conductors 771—772 of the first group selector (Figure 9) directly associated with the battery-feed relay group (Fgure 7) through to conductors 765—766 of the selected register. Ground potential is extended by way of contact 711 to conductor 773 of the associated first group selector.

*(e) Registering the dialed digits*

Dial tone is extended to calling station "A" (Figure 3–A) from the selected register by way of wiper 804, conductor 763, bank contact, wiper 703, contact 728, and conductor 642 to the talking circuit of station "A." The calling person at station "A" then dials the five digits of the wanted station which, in this instance, is assumed to be station "B" (Figure 3–B). The dialing of the first digit causes line relay 805 of the register to correspondingly pulse the first digit switch (magnet 841 and wipers 851, 861 and 871 of Figure 8–B) of the register over the circuit from ground, contacts 807, 813, winding of relay 820, wiper 801 of the In-Dialing distributor, bank contact, conductor 831, winding of magnet 841 to battery. Relay 815 is of the slow-to-release type and remains operated during the dialing of the first digit. Relay 820 operates with the first impulse of the first digit, remains operated during the remaining impulses, and restores shortly following the passing of the last impulse. At contact 821, operated relay 820 causes relay 825 to operate, relay 825 also being of the slow-to-release type. The restoration of relay 820 causes magnet 800 of the In-Dialing distributor to operate by way of contact 826, and the following restoration of relay 825 causes magnet 800 to restore and advance wipers 801—804 to the second contacts of the respective banks. Wiper 804 disconnects the dial tone from conductor 763.

The dialing of the second digit causes line relay 805 of the register to correspondingly pulse the second digit switch (magnet 842 and wipers 852, 862 and 872 of Figure 8–B) of the register over the circuit from ground, contacts 807, 813, winding of relay 820, wiper 801 of the In-Dialing distributor resting on the second bank contact, conductor 832, winding of magnet 842 to battery. As in the case of the first digit, re-operated relay 820 causes relay 825 to re-operate: the second restoration of relay 820 causes magnet 800 of the In-Dialing distributor to re-operate by way of contact 826; and the following restoration of relay 825 causes magnet 800 to restore and advance wipers 801—804 to the third contacts of the respective banks.

Wiper 802 of the In-Dialing distributor in connecting with the third contact of its bank, completes a circuit to relay 891 by way of contact 816, causing relay 891 to operate and lock to ground by way of contacts 808 and 816. At contact 809, relay 891 extends ground potential to conductor 858 for the purpose of causing the selection of the proper set of wipers of the first group selector, in the manner to be explained in a later section of the specification.

The dialing of the third digit causes line relay 805 of the register to correspondingly pulse the third digit switch (magnet 843 and wipers 853, 863 and 873 of Figure 8–B) of the register from ground, contacts 807, 813, winding of relay 820, wiper 801 of the In-Dialing distributor resting on the third bank contact, conductor 833, winding of magnet 843 to battery. As in the case of the second digit, re-operated relay 820 causes relay 825 to again operate: the third restoration of relay 820 causes magnet 800 of the In-Dialing distributor to again operate by way of contact 826; and the following restoration of relay 825 causes magnet 800 to restore and advance wipers 801—804 to the fourth contacts of the respective banks.

Wiper 802 of the In-Dialing distributor in connecting with the fourth contact of its bank, completes a circuit to relay 892 by way of contact 816, causing relay 892 to operate and lock to ground by way of contacts 823 and 816. At contact 824, relay 892 extends ground potential to conductor 859 for the purpose of causing the selection of the proper set of wipers of the second group selector, in the manner to be explained in a later section of the specification.

The dialing of the fourth digit causes line relay 805 of the register to correspondingly pulse the fourth digit switch (magnet 844 and wipers 854, 864 and 874 of Figure 8–B) of the register from ground, contacts 807, 813, winding of relay 820, wiper 801 of the In-Dialing distributor resting on the fourth bank contact, conductor 834, winding of magnet 844 to battery. As in the case of the third digit, re-operated relay 820 causes relay 825 to again operate: the fourth restoration of relay 820 causes magnet 800 of the In-Dialing distributor to again operate by way of contact 826; and the following restoration of relay 825 causes magnet 800 to restore and advance wipers 801—804 to the fifth contacts of the respective banks.

Wiper 802 of the In-Dialing distributor in connecting with the fifth contact of its bank, completes a circuit to relay 893 by way of contact 816, causing relay 893 to operate and lock to ground by way of contacts 836 and 816. At contact 837, relay 893 extends ground potential to conductor 868 for the purpose of causing the selection of the proper set of wipers of the third group selector, in the manner to be explained in a later section of the specification.

The dialing of the fifth digit causes line relay 805 of the register to correspondingly pulse the fifth digit switch (magnet 845 and wipers 855, 865 and 875 of Figure 8–B) of the register from ground, contacts 807, 813, winding of relay 820, wiper 801 of the In-Dialing distributor resting on the fifth bank contact, conductor 835, winding of magnet 845 to battery. As in the case of the fourth digit, re-operated relay 820 causes relay 825 to again operate: the fifth restoration of relay 820 causes magnet 800 of the In-Dialing distributor to again operate by way of contact 826; and the following restoration of relay 825 causes magnet 800 to restore and advance wipers 801—804 to the sixth contacts of the respective banks.

Wiper 802 of the In-Dialing distributor in connecting with the sixth contact of its bank, completes a circuit to relay 894 by way of contact 816, causing relay 894 to operate and lock to ground by way of contacts 838 and 816. At contact 839, relay 894 extends ground potential to conductor 869 for the purpose of causing the selection of the proper set of wipers of the connector, in the manner to be explained in a later section of the specification.

(*f*) *Marking required trunk group of first group selector*

As previously indicated, the operation of relay 891 of the register after the dialing of the second digit extended ground potential to conductor 858. This ground potential on conductor 858 now completes a circuit by way of wiper 890 of the Out-Marking distributor (Figure 8–B), conductor 880, contacts 1848, 1857 (Figure 8–C), winding of relay 1855 to battery. Relay 1855 accordingly operates and locks to ground by way of contacts 1858, 1847, conductor 846 and contact 817.

Should the first dialed digit comprise six or more impulses, then relay 1825 (Figure 8–C) of the register operates from ground, contact 817, conductor 846, conductor 867 (Figure 8–B) wiper 866 of the Out-Marking distributor, bank contacts, wiper 861 of the first digit switch, bank contact 6, 7, 8, 9 or 0 as the case may be, conductor 878, winding of relay 1825 to battery. On the other hand, should the first digit comprise five or less impulses, then relay 1825 cannot operate, as the first five contacts of the bank associated with wiper 861 are unwired. This impulse control of the operation or non-operation of relay 1825 is utilized for controlling the selection of the proper set of wipers of the first group selector, in the manner described in the immediately following paragraphs.

Should relay 1825 remain unoperated at this stage of the register operation, then operated relay 1855 connects relay 1850 to conductor 771 of the first group selector (Figure 9) by way of contacts 1826, 1853, 1846, conductor 765, wiper 705 (Figure 7) and contact 723. From this point, the circuit of relay 1850 is extended to battery by way of conductor 771, contact 911 (Figure 9), contact 933 and lower winding of wiper-selecting relay 920. Relays 1850 and 920 both operate. The operation of relay 920 selects the lower set of wipers represented by characters 951', 952' and 953'. Operated relay 920 locks to ground on conductor 773 from contact 711 by way of contact 927 and conductor 773. The operation of relay 1850 connects relay 1830 to conductor 772 of the first group selector by way of contacts 1851, 1854, conductor 766, wiper 706 and contact 729. From this point, the circuit of relay 1830 is extended to ground by way of conductor 772, contacts 913, 938 and lower winding of relay 930. Relays 1830 and 930 both operate. Operated relay 930 locks to ground on conductor 771 from the winding of operated relay 1850 by way of contact 932, and opens the circuit of the lower winding of relay 920 at contact 933. Relay 920, however, is locked in the operated position through its contact 927 and cannot restore at this time. Relay 1830 causes relay 1835 to operate from ground on conductor 846, contacts 1832, 1842, winding of relay 1835 to battery. Relay 1835 completes a circuit to motor magnet 850 of the Out-Marking distributor (Figure 8–B) from ground, contacts 1841, 1837, 1822, conductor 840, winding of magnet 850 to battery, causing magnet 850 to operate.

On the other hand, should relay 1825 operate at the stage of the register operation mentioned in the preceding paragraph, then operated relay 1855 connects relay 1830 to conductor 772 of the first group selector by way of contacts 1827, 1854, conductor 766, wiper 706 and contact 729. From this point, the circuit of relay 1830 is extended to ground by way of conductor 772, contacts 913, 938 and lower winding of relay 930. Relays 1830 and 930 both operate. Operated relay 1830 causes relay 1835 to operate from ground on conductor 846, contacts 1832, 1842, winding of relay 1835 to battery. At contact 1836, relay 1835 connects relay 1850 to conductor 771 of the first group selector by way of contacts 1853, 1846, conductor 765, wiper 705 and contact 723, and operated relay 930 locks to ground from the winding of relay 1850 by way of contacts 932 and 911. Relay 1850 also operates over the just described circuit through the upper winding of relay 930. Wiper switching relay 920 is disabled at contact 933 and cannot operate to switch the wiper groups of the first group selector. Operated relay 1835 also completes a circuit to motor magnet 850 of the Out-Marking distributor (Figure 8–B) of the register from ground, contacts 1841, 1837, 1822, conductor 840, winding of magnet 850 to battery, causing magnet 850 to operate.

It will thus be seen that the non-operation or the operation of relay 1825 in the register controls the sequence in which relays 1850 and 1830 are respectively connected to conductors 771 and 772 of the first group selector (Figure 9), in order that the wiper-switching relay 920 of the first group selector will or will not be operated. In this manner, the selection of the proper wiper group of the first group selector is made, according to the value of the first dialed digit. In either event, relays 1850 and 1830 are both operated.

The operations of both relays 1850 and 1830 complete a circuit to one of the five frequency-connecting relays 1801–1805 from ground, contact 809 (Figure 8–A), conductor 858, wiper 890 of the Out-Marking distributor, conductor 880, contacts 1848, 1859, 1852, 1833, conductor 877, wiper 876 of the Out-Marking distributor, first bank contact, wiper 871 of the first digit switch, bank contact to which wiper 871 was advanced responsive to the dialing of the first digit, conductor 881, 882, 883, 884 or 885, as the case may be, winding of relay 1801, 1802, 1803, 1804, or 1805, as the case may be, to battery. The frequency connecting relay selected by wiper 871 of the first digit switch accordingly operates and, at its contact 1811, 1812, 1813, 1814 or 1815, as the case may be, extends frequency F–1, F–2, F–3, F–4 or F–5, as the case may be, through the primary winding of transformer 1800 to ground, thus activating transformer 1800. A corresponding alternating current is accordingly induced into the secondary winding of transformer 1800.

Digressing for the moment from the description of the operation of the register and the first group selector, attention is now directed to the bank and wiper arrangements of the first group selector (Figure 9). As previously explained, each group selector is fitted with two sets of trunk wipers and an extra-control wiper which is common to both sets of trunk wipers. In the present embodiment there are 55 contacts in each of the banks associated with the mentioned wipers, the arrangement of the seven banks being shown in Figure 12. The upper set of trunk banks accommodates five sets of trunks extending to five groups of second group selectors designated groups 1, 2, 3, 4 and 5, and the lower set of trunk banks accommodates five sets of trunks extending to five groups of second group selectors designated groups 6, 7, 8, 9 and 10. It will thus be seen that each first group selector has access to 10 groups of second group selectors. The extra-control bank, being common to both sets of trunk banks, shows only five trunk groups designated groups 1, 2, 3, 4 and 5, it being understood that the wiper selecting relay 920 associates either the upper or lower set of trunk banks, as the case may be, with the extra-control bank.

Referring now specifically to the extra-control bank diagrammed at the bottom of Figure 9, there is an additional contact before each of the five groups of trunk contacts, these additional contacts being designated 961, 962, 963, 964 and 965 respectively. Contacts 961—965 are "home" contacts respectively for the trunk groups 11—10, 21—20, 31—30, 41—40 and 51—50, to which home contacts EC wiper 954 is directed preparatory to searching for a free trunk outlet in the respective trunk group. Contacts 961—965 are also "busy overflow" contacts respectively for the trunk groups 51—50, 11—10, 21—20, 31—30 and 41—40, to which overflow contacts EC wiper 954 is rotated in the event there is no free trunk available in the respective marked trunk group.

Returning now to the description of the operation of the register and the first group selector, the alternating current developed in the secondary winding of the transformer 1800 (Figure 8–C) is extended to conductors 771—772 of the first group selector from the upper terminal of the secondary winding by way of contacts 1853, 1846, conductor 765, wiper 705 and contact 723 to conductor 771, and from the lower terminal of the secondary winding by way of condenser 1806, contact 1854, conductor 766, wiper 706, contact 729 to conductor 772. The loop is completed from conductor 771, contact 911 through the windings of the five magnets 901–905 in series, condenser 919, contact 913 to conductor 772. The particular magnet tuned to the frequency of the current flowing from the secondary winding of transformer 1800 accordingly vibrates its associated reed, thereby operating contacts 900, 906, 907, 908 or 909, as the case may be. If contacts 900 are operated, then contact 961 of the EC bank is marked with the ground potential: if contacts 906 are operated, then contact 962 of the EC bank is marked with ground potential: if contacts 907 are operated, then contact 963 of the EC bank is marked with ground potential: if contacts 908 are operated, then contact 964 of the EC bank is marked with ground potential; and if contacts 909 are operated, then contact 965 of the EC bank is marked with ground potential.

(g) *Finding marked trunk group of first group selector*

Assuming now that contact 965 of the EC bank of the first group selector is marked with ground potential and that EC wiper 954 is standing on contact 961 of the EC bank as diagrammed at the bottom of Figure 9, then relays 1830, 1835, 1850, 1855, frequency connecting relay 1805, magnet 850 of the register and magnet 905 of the first group selector are in the operated position. A circuit is now complete from ground at contact 917, contact 931 (relay 930 having been operated shortly after the dialing of the second digit in the manner previously described) contact 928, interrupter contact 949, winding of motor magnet 950 to battery. Magnet 950 accordingly "self-drives" wipers 951—954 and 951'—954' in well-known manner across the related bank contacts.

As EC wiper 954 connects with bank contact 965, ground is extended by way of contacts 917, 931, 928, interrupter contact 949, contact 936 to the left-hand terminal of the upper winding of test relay 935. This ground forms a short-circuit around the upper winding of relay 935 in combination with the ground from bank contact 965 through EC wiper 954 to the right-hand terminal of relay 935. The ground through interrupter contact 949, however, causes magnet 950 to operate and open interrupter contact 949 to remove ground from contact 936 of relay 935. As a consequence, relay 935 operates from ground on EC bank contact 965, EC wiper 954, upper winding of relay 935, contact 936, winding of operated magnet 950 to battery, operated magnet 950 being held operated in series with the upper winding of relay 935.

Operated relay 935 locks to ground on EC bank contact 965 by way of EC wiper 954, upper winding of relay 935, contact 937, lower winding of relay 935 to battery. At contact 936, relay 935 opens the circuit through magnet 950 causing magnet 950 to restore and advance wipers 951—954 and 951'—954' to the respective bank contacts which correspond to the first trunk of the "found" trunk group leading to the required group of second group selectors. At contact 939, relay 935 extends ground potential from contact 944 to the EC bank contacts of all of the trunks in the five groups: at contact 929, extends a self-interrupting circuit from magnet 950 to the "C" wiper (953 or 953' as the case may be) by way of contacts 915, 925 or 926, as the case may be: at contact 934, connects EC wiper 954 to the right-hand terminal of the upper winding of switching-through relay 910; and, at contact 938, disconnects ground through the lower winding of relay 930 from conductor 772 leading back to the winding of relay 1830 (Figure 8–C) of the register, causing relay 1830 to restore. Relay 930, however, remains operated through its upper winding.

At contact 1833, restored relay 1830 opens the circuit to the operated frequency-connecting relay 1805 thereby to disconnect frequency F–5 from the primary winding of transformer 1800. Magnet 905 accordingly restores and disconnects marking ground from contact 965 of the EC bank of the first group selector. At contact 1832, relay 1830 disconnects ground potential from contact 1842 of relay 1840 thereby causing relay 1840 to operate from ground on conductor 846, contact 1856, winding of relay 1840, contact 1838, winding of operated relay 1835 to battery. The just traced circuit also maintains relay 1835 in the operated position.

At contact 1841, relay 1840 disconnects ground potential from operated magnet 850 of the Out-Marking distributor thereby causing magnet 850 to restore and advance wipers 876, 866, 870 and 890 from the respective No. 1 bank contacts to the respective No. 2 bank contacts, In order that the next group selector (second group selector) may be later marked in accordance with the value of the second dialed digit. The advancing of wiper 866 from bank contact No. 1 to bank contact No. 2 disconnects wiper 861 of the first digit switch from ground potential on conductors 867, 846 and therefore, should relay 1825 have been operated as a result of the dialing of the first digit (if the first digit consisted of six or more impulses as previously explained) relay 1825 will now restore to normal. At contact 1844, relay 1840 connects the grid circuit of thyratron tube 1860 to trunk conductor 771 by way of contacts 1853, 1846, conductor 765, wiper 705 and contact 723.

At this stage of the connection, relays 1835, 1840, 1850, 1855 of the register and relays 930, 935 of the first group selector are in the operated position.

(*h*) *Hunting in marked trunk group of first group selector*

Assuming further that trunk group 51—50 (group 5 in Figure 12) leading from the upper set of banks of the first group selector respectively to 10 second group selectors 51—50 is the "found" trunk group, then control wiper 953 of the first group selector is standing on the control conductor 943 of second group selector 51. If second group selector 51 is in prior use at this time, ground potential on conductor 943 of second group selector 51 is relayed to the winding of motor magnet 950 of the first group selector by way of wiper 953 of the first group selector, contacts 925, 915, 929 and interrupter contact 949. Magnet 950, consequently, "self-drives" wipers 951—954 and 951'—953' in well-known manner to the next adjacent bank contacts.

It should be understood at this time that EC wiper 954 is of the "bridging" type, i. e., it makes contact with the next adjacent bank contact just before it breaks contact with the preceding bank contact and, consequently, relay 935 remains locked as EC wiper 954 passes from contact 51 to contact 52. If second group selector 52 is also in prior use when tested by control wiper 953 of the first group selector, magnet 950 self-drives the wipers of the first group selector to the respective adjacent bank contacts. This interaction continues until control wiper 953 of the first group selector tests a second group selector of the group 51—50 not in prior use, or until control wiper 953 tests second group selector 50. If second group selector 50 also is in prior use, magnet 950 self-drives the wipers of the first group selector to the respective overflow bank contacts for the second group selector group 51—50, which in this instance are the contacts immediately preceding the bank contacts representing second group selector 11 of the group 11—10. Since there is no ground potential on contact 961 of the EC bank of the first group selector, test relay 935 of the first group selector restores, and busy tone is returned to calling station "A" in the manner described in the following paragraph.

At contact 938, restored relay 935 re-completes the circuit of restored relay 1830 of the register from ground, lower winding of relay 930, contacts 938, 913, conductor 772, contact 729, wiper 706, conductor 766, contacts 1854, 1851, winding of relay 1830 to battery, causing relay 1830 to re-operate and lock to ground on conductor 772 at contact 1831 independent of relay 1850. At this particular point, relays 1835 and 1840 are locked in series to ground on conductor 846 by way of contact 1856, and wipers 876, 866, 870 and 890 of the Out-Marking distributor are standing on the No. 2 contacts of the respective banks. Re-operated relay 1830 completes a circuit from ground, winding of busy relay 745 (Figure 7), contact 724, wiper 707, conductor 767, contacts 1843, 1834, resistor 1829 to battery, causing busy relay 745 to operate. At contact 742, busy relay 745 disables the holding circuit of relay 720, causing relay 720 to restore and reconnect line relay 715 across line conductors 641—642 at contacts 725 and 727. Line relay 715 re-operates and establishes a locking circuit for busy relay 745 by way of contacts 743, 733, 716 and resistor 709. Busy tone relay 745 extends busy tone to the talking circuit of calling station "A" by way of contacts 744, 736, 725 and conductor 641. At contact 746, busy relay 745 disconnects guarding and holding ground from conductor 773 of the occupied first group selector.

The restoration of relay 720 also disconnects calling station "A" from the occupied register at contacts 726, 728, thereby opening the loop circuit of line relay 805 of the register and thus preparing the register for release: disconnects guarding ground from the register at contact 722: frees the register from the occupied first group selector at contacts 723, 729, thereby causing the restoration of relay 930 of the first group selector; and disconnects the holding circuit of hold relay 710 from the register at contact 731 but relay 710 is now being held in the operated position from ground by way of contacts 753, 741 and 719. The first group selector is now at normal and its wipers remain on the respective occupied bank contacts.

The calling station "A," upon hearing the busy tone, returns the handset to the cradle, thereby opening the loop circuit of line relay 715 and causing line relay 715 to restore. At contact 719, line relay 715 disables hold relay 710 and relay 710, at contact 711, removes the holding and guarding ground from conductor 643. The switches preceding the combined battery-feed relay group and register finder are thereby released in well-known manner. The restoration of hold relay 710 also frees the combined battery-feed relay group and register finder for use on a future call.

(*i*) *Switching through to seized second group selector*

Should second group selector 51, however, be in free condition when tested by control wiper 953 of the first group selector (Figure 9), then there will be no ground potential connected to control wiper 953 and, consequently, magnet 950 of the first group selector cannot be energized. Under this condition, switching through relay 910 of the first group selector is operated from ground, contacts 944, 939, contact 51 of the EC bank, EC wiper 954, contact 934, upper winding of relay 910, contact 929, interrupter contact 949, winding of magnet 950 to battery. Magnet 950, however, does not operate due to the high resistance value of the upper winding of relay 910. Switching-through relay 910 locks to ground on conductor 773 by way of contact 918.

At contacts 912, 914, 916, switching-through relay 910 switches conductors 771, 772, 723 leading from the battery-feed relay group (Figure 7) respectively to conductors 941, 942, 943 of second group selector 51. In this manner, the first group selector seizes second group selector 51, and also switches the occupied register (Figures 8–A, 8–B, 8–C) through to second group selector 51. The locking circuit to the upper winding of relay 930 of the first group selector is now open at contact 911, and relay 930 of the first group selector restores. The circuit to the lower winding of relay 930 of the first group selector is disabled at contact 913, and relay 930 of the first group selector cannot re-operate. At contact 944, switching-through relay 910 of the first group selector disables the locking circuit of test relay 935 of the first group selector to cause it to restore. At contact 917 switching-through relay 910 of the first group selector disconnects ground potential from contact 928 of restored test relay 935 to prevent any possibility of re-establishing a local pulsing circuit for magnet 950 of the first group selector.

The operation of switching-through relay 910 of the first group selector switches conductor 771 from contact 911 to contact 912 and thereby causes a momentary break in the circuit of relay 1850 of the register. As a consequence, a voltage surge is produced at the grid of Thyratron tube 1860, which causes Thyratron tube 1860 to "flash" in well-known manner and operate relay 1845 from negative potential at the plate of tube 1860, contacts 1839, 1807, winding of relay 1845 to ground. At contact 1846, relay 1845 causes relay 1850 to restore. At contacts 1847 and 1848, relay 1845 disables relay 1855 and relay 1855 restores. At contact 1856, restored relay 1855 disables relays 1840 and 1835, and both these relays restore. At contact 1839, relay 1840 disables operated relay 1845 to cause its restoration and, at contact 1848, cause the re-operation of relay 1855 from ground, contact 824 (Figure 8–A), conductor 859, wiper 890 of the Out-Marking distributor standing on the second contact of its bank, conductor 880, contacts 1848, 1857, winding of relay 1855 to battery. Re-operated relay 1855 locks to ground on conductor 846 by way of contacts 1858 and 1847. At contact 1844, relay 1840 disables the grid circuit of Thyratron tube 1860. The register is now ready to mark the EC bank of the second group selector 51, which is also wired in accordance with Figure 9.

In like manner, the first group selector can switch through a calling station to any one of the second group selectors 52—50.

(*j*) *Marking required trunk group of second group selector*

Should the second dialed digit comprise six or more impulses, then relay 1825 (Figure 8–C) of the register re-operates from ground, contact 817, conductor 846, conductors 867 (Figure 8–B) wiper 866 of the Out-Marking distributor standing on contact No. 2 of its bank, wiper 862 of the second digit switch, bank contact 6, 7, 8, 9 or 0, as the case may be, conductor 878, winding of relay 1825 to battery. On the other hand, should the second digit comprise five or less impulses, then relay 1825 cannot re-operate, as the first five contacts of the bank associated with wiper 862 are unwired. This impulse control of the re-operation or the non-re-operation of relay 1825 is utilized for controlling the selection of the proper set of wipers of the second group selector.

Should relay 1825 remain unoperated at this stage of the register operation for the second dialed digit, then re-operated relay 1855 connects relay 1850 to conductor 941 of the second group selector 51 by way of contacts 1826, 1853, 1846, conductor 765, wiper 705, contact 723, conductor 771, contact 912 of the first group selector, contact 921 and wiper 951 standing on conductor 941 of the second group selector 51. From this point, the circuit of relay 1850 is extended to battery by way of contact 911 of the second group selector, contact 933 and lower winding of wiper-selecting relay 920. Relay 1850 re-operates and relay 920 of the second group selector operates. The operation of relay 920 selects the lower set of wipers of the second group selector represented by the characters 951′, 952′ and 953′. Relay 920 locks to ground on conductor 773 by way of contact 927, conductor 943, wiper 953 of the first group selector standing on the "C" bank contact connected to conductors 943, contacts 925, 916 of the first group selector and conductor 773. The re-operation of relay 1850 connects relay 1830 to conductor 942 of the second group selector by way of contacts 1851, 1854, conductor 766, wiper 706, contact 729, conductor 772, contact 914 of the first group selector, contact 923, and wiper 952 standing on conductor 942 of the second group selector. From this point, the circuit of relay 1830 is extended to ground by way of contact 913 of the second group selector, contact 938 and lower winding of relay 930. Relay 1830 re-operates and relay 930 of the second selector operates. Operated relay 930 locks to ground on conductor 771 from the winding of re-operated relay 1850, and opens the circuit of the lower winding of wiper-switching relay 920 at contact 933. Relay 920, however, is locked in the operated position through its contact 927 and cannot restore at this time. Re-operated relay 1830 causes relay 1835 to re-operate from ground on conductor 846, contacts 1832, 1842, winding of relay 1835 to battery. Relay 1835 completes a circuit to magnet 850 of the Out-Marking distributor from ground, contacts 1841, 1837, 1822, conductor 840, winding of magnet 850 to battery, causing magnet 850 to re-operate.

On the other hand, should relay 1825 re-operate at the stage of the register operation mentioned in the preceding paragraph, then re-operated relay 1855 connects relay 1830 to conductor 942 of the second group selector by way of contacts 1827, 1854, conductor 766, wiper 706, contact 729, conductor 772, contact 914 of the first group selector, contact 923, wiper 952 standing on conductor 942 of the second group selector. From this point, the circuit of relay 1830 is extended to ground by way of conductor 942 of the second group selector, contacts 913, 938 and lower winding of relay 930. Relay 1830 re-operates, and relay 930 of the second group selector operates. Re-operated relay 1830 causes relay 1835 to re-operate from ground on conductor 846, contacts 1832, 1842, winding of relay 1835 to battery. At contact 1836, relay 1835 connects relay 1850 to conductor 941 of the second group selector by way of contacts 1853, 1846, conductor 765, wiper 705, contact 723, conductor 771, contact 912 of the first group selector, contact 921, wiper 951 standing on conductor 941 of the second group selector. Operated relay 930 of the second group selector locks to ground from the winding of relay 1850 by way of contacts 932 and 911. Relay 1850 also re-operates over this just traced circuit. Wiper-switching relay 920 of the second group selector is disabled at contact 933 and cannot operate to switch the wiper groups of the second group selector. Operated relay 1835 also completes a circuit to motor magnet 850 of the Out-Marking distributor of the register from ground, contacts 1841, 1837, 1822, conductor 840, winding of magnet 850 to battery, causing magnet 850 to re-operate.

The non-operation or operation of relay 1825 in the register, as a consequence of the dialing of the second digit, controls the sequence in which relays 1850 and 1830 are respectively connected to conductors 941 and 942 of the second group selector, in order that wiper-switching relay 920 of the second group selector will or will not be operated. In this manner, the selection of the proper wiper group of the second group selector is made, according to the value of the second dialed digit. In either event, relays 1850 and 1830 are both re-operated.

The re-operations of both relays 1850 and 1830 complete a circuit to one of the frequency-connecting relays 1801—1805 from ground, contact 824, conductor 859, wiper 890 of the Out-Marking distributor standing on its No. 2 bank contact, conductor 880, contacts 1848, 1859, 1852, 1833, conductor 877, wiper 876 of the Out-Marking distributor standing on its No. 2 bank contact, wiper 872 of the second digit switch, bank contact to which wiper 872 was advanced responsive to the dialing of the second digit, one of the conductors 881—885, one of the relays 1801—1805 to battery. The frequency-connecting relay selected by wiper 782 of the second digit switch accordingly operates and extends the corresponding frequency of F1—F5 through the primary winding of transformer 1800 to ground, thus re-activating transformer 1800. A corresponding alternating current is accordingly induced into the secondary winding of transformer 1800.

The second development of alternating current in the secondary winding of transformer 1800 is extended to conductors 941 and 942 of the second group selector by way of the battery-feed relay group and register-finder (Figure 7) and the first group selector. The loop is completed from conductor 941 of the second group selector through the windings of the five magnets 901—905 of the second group selectors in series, condenser 919, contact 913 to conductor 942. The particular magnet tuned to the frequency of the current now flowing from the secondary winding of transformer 1800 accordingly vibrates its associated reed, thereby operating contacts 900, 906, 907, 908 or 909 of the second group selector, as the case may be.

*(k) Hunting and seizing third group selector*

In order to simplify and condense the description of the operation of the second group selector, it is now assumed that contact 965 of the EC bank of the second group selector 51 is marked with ground potential from contacts 909 of magnet 905, and that EC wiper 954 of the second group selector 51 is standing on contact 961 of its bank. The second group selector 51 then finds the third selector group 51—50 leading from the upper set of banks of the second group selector 51, and "switches-through" to third group selector 51, in a manner similar to that previously described for the operation and switching through of the first group selector. It should be understood at this time that re-operated relay 1855 of the register has been restored a second time and then re-operated, as a result of the operation of switching-through relay 910 of the second group selector 51. It should also be understood at this time that motor magnet 850 of the Out-Marking distributor has been caused to advance its wipers 876, 866, 870 and 890 to the contacts No. 3 of the respective banks in order that the seized third group selector 51 may be marked in accordance with the value of the third dialed digit. The seized third group selector 51 is also wired in accordance with Figure 9.

In like manner, the second group selector can switch a calling station to any one of the third group selectors 52—50.

*(l) Marking required trunk group of third group selector*

The marking of the required connector group of the seized third group selector 51 is accomplished in a manner similar to that previously described in sub-section *(j)* of this specification for the marking of the required trunk group of the second group selector. In the case of the third group selector 51, however, it should be understood that wipers 876, 866, 870 and 890 of the Out-Marking distributor are standing on the respective No. 3 bank contacts, and that the occupied second group selector 51 is interposed between the occupied first group selector and the third group selector 51.

*(m) Hunting and seizing a connector*

In order to simplify and condense the description of the operation of the third group selector, it is now assumed that contact 965 of the EC bank of the third group selector 51 is marked with ground potential from contacts 909 of magnet 905, and that EC wiper 954 of the third group selector 51 is standing on contact 961 of its bank. The third group selector 51 then finds the connector group 51—50 leading from the upper set of banks of the third group selector 51, and "switches-through" to connector 51, in a manner similar to that previously described for the operation and switching-through of the first group selector. It should be understood at this time that re-operated relay 1855 of the register has been restored a third time and then re-operated, as a result of the operation of switching-through relay 910 of the third group selector 51. It should also be understood at this time that motor magnet 850 of the Out-Marking distributor has been caused to advance its wipers 876, 866, 870 and 890 to the contacts No. 4 of the respective banks, in order that the seized connector 51 may be marked in accordance with the value of the fourth dialed digit, preparatory to connector 51 hunting the required subscriber line circuit group. The seized connector 51 is wired in accordance with Figure 10.

In like manner, the third group selector can switch a calling station to any one of the connectors 52—50.

*(n) Marking required line circuit group of connector*

Should the fourth dialed digit comprise six or more impulses, then relay 1825 (Figure 8–C) of the register re-operates from ground, contact 817, conductor 846, conductor 867 (Figure 8–B), wiper 866 of the Out-Marking distributor standing on contact No. 4 of its bank, wiper 864 of the fourth digit switch, bank contact 6, 7, 8, 9 or 0, as the case may be, conductor 878, winding of relay 1825 to battery. Should the fourth digit, however, comprise five or less impulses, then relay 1825 cannot operate, as the first five contacts of the bank associated with wiper 864 are unwired. This impulse control of the re-operation or the non-re-operation of relay 1825 is utilized for controlling the selection of the proper set of wipers of the connector.

Should relay 1825 remain unoperated at this stage of the register operation for the fourth dialed digit, then re-operated relay 1855 connects relay 1850 to connector 1086 of the seized connector by way of contacts 1826, 1853, 1846, conductor 765, wiper 705, contact 723, conductor 771, contacts 912, 921 of the first group selector, wiper 951 standing on conductor 941 of the second group selector, contacts 912, 921 of the second group selector, wiper 951 standing on conductor 941 of the third group selector, contacts 912, 921 of the third group selector, wiper 951 standing on conductor 1086 of the connector 51. From this point, the circuit of relay 1850 is extended to battery by way of conductor 1086 of the connector, contacts 1013, 1012, 1070, 1019 and upper winding of wiper-selecting relay 1075. Relay 1850 re-operates and relay 1075 of the connector operates. The operation of relay 1075 selects the lower set of wipers of the connector represented by the characters 1091′, 1092′, 1093′ and 1094′. Operated relay 1075 locks to ground on conductor 1088 of the connector, wiper 953 of the third group selector standing on the "C" bank contact connected to conductor 1088 of the connector, contacts 925, 916 of the third group selector, conductor 943 of the third group selector, wiper 953 of the second group selector standing on the "C" bank contact connected to conductor 943 of the third group selector, contacts 925, 916 of the second group selector, conductor 943 of the second group selector, wiper 953 of the first group selector standing on the "C" bank contact connected to conductor 943 of the second group selector, contacts 925, 916 of the first group selector and conductor 773. The re-operation of relay 1850 connects relay 1830 to conductor 1087 of the connector by way of contacts 1851, 1854, conductor 766, wiper 706, contact 729, conductor 772, contacts 914, 923 of the first group selector, wiper 952 standing on conductor 942 of the second group selector, contacts 914, 923 of the second group selector, wiper 952 standing on conductor 942 of the third group selector, contacts 914, 923 of the third group selector, and wiper 952 standing on conductor 1087 of the connector. From this point, the circuit of relay 1830 is extended to ground by way of conductor 1087 of the connector, lower winding of relay 1010 and contacts 1041, 1064. Relay 1830 re-operates and relay 1010 of the connector operates. Operated relay 1010 locks to ground on conductor 771 from the winding of re-operated relay 1850, and opens the circuit of the upper winding of wiper switching relay 1075 at contact 1012. Relay 1075, however, is locked in the operated position through its contact 1076 and cannot restore at this time. Relay 1030 causes relay 1835 to re operate from ground on conductor 846, contacts 1832, 1842, winding of relay 1835 to battery. Relay 1835 completes a circuit to magnet 850 of the Out-Marking distributor from ground, contacts 1841, 1837, 1822, conductor 840, winding of magnet 850 to battery, causing magnet 850 to re-operate.

On the other hand, should relay 1825 re-operate at the stage of the register operation mentioned in the preceding paragraph, then re-operated relay 1855 connects relay 1830 to conductor 1087 of the connector by way of contacts 1827, 1854, conductor 766, wiper 706, contact 729, conductor 772, contacts 914, 923 of the first group selector, wiper 952 standing on conductor 942 of the second group selector, contacts 914, 923 of the second group selector, wiper 952 standing on conductor 942 of the third group selector, contacts 914, 923 of the third group selector and wiper 952 standing on conductor 1087 of the connector. From this point, the circuit of relay 1830 is extended to ground by way of conductor 1087 of the connector, lower winding of relay 1010 and contacts 1041, 1064. Relay 1830 re-operates and relay 1010 of the connector operates. Re-operated relay 1830 causes relay 1835 to re-operate from ground on conductor 846, contacts 1832, 1842, winding of relay 1835 to battery. At contact 1836, relay 1835 connects relay 1850 to conductor 1086 of the connector by way of contacts 1853, 1846, conductor 765, wiper 705, contact 723, conductor 771, contacts 912, 921 of the first group selector, wiper 951 standing on conductor 941 of the second group selector, contacts 912, 921 of the second group selector, wiper 951 standing on conductor 941 of the third group selector, contacts 912, 921 of the third group selector, and wiper 951 standing on conductor 1086 of the connector. Operated relay 1010 locks to ground from the winding of relay 1850 by way of contacts 1011 and 1013. Relay 1850 also re-operates over the just traced circuit. Wiper switching relay 1075 of the connector is disabled at contact 1012 and cannot operate to switch the wiper groups of the connector. Re-operated relay 1835 also completes a circuit to magnet 850 of the Out-Marking distributor from ground, contacts 1841, 1837, 1822, conductor 840, winding of magnet 850 to battery, causing magnet 850 to re-operate.

The non-re-operation or the re-operation of relay 1825 in the register as a consequence of the dialing of the fourth digit controls the sequence in which relays 1850 and 1830 are respectively connected to conductors 1086 and 1087 of the connector, in order that wiper switching relay 1075 of the connector will or will not be operated. In this manner, the selection of the proper wiper group of the connector is made, according to the value of the fourth dialed digit. In either event both relays 1850 and 1830 are operated for the third time.

The third re-operations of both relays 1850 and 1830 complete a circuit to one of the frequency-connecting relays 1801—1805 from ground, contact 839, conductor 869, wiper 890 of the Out-Marking distributor standing on its No. 4 bank contact, conductor 880, contacts 1848, 1859, 1852, 1933, conductor 877, wiper 876 of the Out-Marking distributor standing on its No. 4 bank contact, wiper 874 of the fourth digit switch, bank contact to which wiper 874 was advanced responsive to the dialing of the fourth digit, one of the conductors 881—885, one of the relays 1801—1805 to battery. The frequency-controlling relay selected by wiper 874 of the fourth digit switch accordingly operates and extends the corresponding frequency of F–1—F–5 through the primary winding of transformer 1800 to ground, thus again reactivating transformer 1800. A corresponding alternating current is accordingly introduced into the secondary winding of transformer 1800.

As previously explained, each connector is fitted with two sets of line banks, an "extra-control" bank, two sets of line wipers and an "extra-control" wiper, the "extra-control" bank being located between the two sets of line banks. The two sets of line banks each comprise four rows of contacts designated "−," "+," "C" and "D," respectively, as shown to the right in Figure 10. The upper set of line banks accommodates five sets of trunks extending to five groups of subscribers' line circuits, and the lower set of line banks accommodates five sets of trunks extending to five other groups of subscribers' line circuits. It will thus be seen that each connector has access to ten groups of line circuits. The extra-control bank, being common to both sets of line banks, accommodates only five groups, it being understood that the wiper-selecting relay 1075 associates either the upper or lower set of line banks, as the case may be, with the extra-control bank.

Referring now specifically to the extra-control bank diagrammed at the bottom of Figure 10, there is an additional contact before each of the five groups of line circuit contacts, these additional contacts being designated 11, 21, 31, 41 and 51, respectively. Contacts 11—51 are "home" contacts respectively for the line circuit groups, to which home contacts EC wiper 1095 is directed preparatory to finding the desired line circuit in the repeater line circuit group.

The fourth development of alternating current in the secondary winding of transformer 1800 is extended to conductors 1086, 1087 of the connector by way of the battery-feed relay group and register-finder (Figure 7), the first group selector, the second group selector and the third group selector. The loop is completed from conductor 1087 of the connector through the windings of the five magnets 1001–1005 of the connector in series, contact 1073, capacitator 1085, contacts 1011, 1013 to conductor 1086. The particular magnet tuned to the frequency of the current now flowing from the secondary winding of transformer 1800 accordingly vibrates its associated read, thereby operating contacts 1000, 1006, 1007, 1008 or 1009, as the case may be. If contacts 1000 are operated, then contact 11 of the EC bank is marked with battery potential: if contacts 1006 are operated, then contact 21 of the EC bank is marked with battery potential: if contacts 1007 are operated, then contact 31 of the EC bank is marked with battery potential: if contacts 1008 are operated, then contact 41 of the EC bank is marked with battery potential; and if contacts 1009 are operated then contact 51 of the EC bank is marked with battery potential. In addition, the operation of any of the contacts 1000, 1006, 1007, 1008 and 1009 also completes a circuit from ground, lower winding of relay 1050 of the connector, resistor 1096, resistor B, C, D, E or F, as the case may be, contacts 1009, 1008, 1007, 1006 or 1000, as the case may be, resistor A to battery, causing the relay 1050 to operate.

(*o*) *Finding marked line circuit group of connector*

Assuming now that contact 51 of the EC bank of connector 51 is marked with battery potential, EC wiper 1095 is standing on contact 11 of the EC bank as diagrammed at the bottom of Figure 10, and relay 1050 has been operated through resistors 1096, B and A as previously described, then relays 1830, 1835, 1850, 1855, frequency-connecting relay 1805 and magnet 850 of the register and magnet 1005, relay 1050 and relay 1010 of connector 51 are in the operated position. At contact 1052, relay 1050 prepares a point in the circuit of the upper winding of relay 1040: at contact 1053, connects a multiple ground to the lower winding of operated relay 1010; and, at contact 1054, completes an obvious circuit to the lower winding of relay 1015. Relay 1015, however, can operate only sufficiently to close only its "X" contact 1016 at this time, as the closing of contact 1016 causes the upper winding of relay 1015 to be short-circuited with ground potential on both terminals of the upper winding, and the power of the lower winding alone is insufficient to fully operate relay 1015. Operated relay 1050 also completes a circuit from ground, contacts 1063, 1038, 1049, interrupter contact 1089, winding of motor magnet 1090 to battery. Magnet 1090 accordingly self-drives wipers 1091–1095 and 1091'–1094' in well-known manner across the related bank contacts.

As EC wiper 1095 connects with bank contact 51, the battery potential on bank contact 51 is extended to ground by way of EC wiper 1095, contact 1052 and the upper winding of relay 1040, causing relay 1040 to operate. At contact 1038, relay 1040 opens the operating circuit of magnet 1090 to hold the wipers of the connector on their respective bank contacts corresponding to EC bank contact 51. At contact 1041, relay 1040 disconnects ground potential from the lower winding of operated relay 1010 thereby causing relay 1830 of the register to restore. Relay 1010, however, remains operated through its upper winding.

At contacts 1833, restored relay 1830 opens the circuit to the operated frequency-connecting relay 1805 thereby to disconnect frequency F-S from the primary winding of transformer 1800. Magnet 1005 accordingly restores and disconnects marking battery from the upper winding of relay 1040 and the lower winding of relay 1050, causing both relays to restore. At contacts 1832, relay 1830 disconnects ground potential from contact 1842 thereby causing relay 1840 to operate from ground on conductor 846, contact 1856, winding of relay 1840, contact 1838, winding of operated relay 1835 to battery. The just traced circuit also maintains relay 1835 in the operated position. At contact 1844, relay 1840 connects the grid circuit of Thyratron tube 1860 to conductor 1086 of connector 51 by way of contacts 1853, 1846, conductor 765, wiper 705, contact 723, and conductors 771, 941 and wipers 951 of the first, second and third group selectors. At contact 1841, relay 1840 disconnects ground potential from operated magnet 850 of the Out-Marking distributor thereby causing magnet 850 to restore and advance wipers 876, 866, 870 and 890 from the respective No. 4 bank contacts to respective No. 5 bank contacts. Bank contact No. 5 of wiper 876 is unwired and, therefore, no circuit can be completed to one of the frequency-connecting relays 1801–1805 as long as wiper 876 remains on its bank contact No. 5. As wiper 866 leaves its bank contact No. 4, wiper 864 of the fourth digit switch is disconnected from ground potential on conductors 876, 846 and, therefore, should relay 1825 have been operated as a result of the dialing of the fourth digit (if the fourth digit consisted of six or more impulses as previously explained), relay 1825 will now restore to normal. As wiper 866 connects with contact No. 5 of its bank, however, wiper 865 of the fifth digit switch is connected to ground potential on conductors 867, 846.

Should the fifth dialed digit comprise five or less impulses then relay 1825 (Figure 8–C) of the register re-operates from ground, contact 817, conductor 846, conductor 867 (Figure 8–B), wiper 866 of the Out-Marking distributor standing on contact No. 5 of its bank, wiper 865 of the fifth digit switch, contact 1, 2, 3, 4 or 5, as the case may be, conductor 878, winding of relay 1825 to battery. Should the fifth digit, however, comprise six or more impulses, then relay 1825 cannot re-operate, as the last five contacts of the bank associated with wiper 865 are unwired. This impulse control of the re-operation of relay 1825 is utilized for controlling the selection of the required line circuit in the line circuit group 51 of the connector.

The mentioned restoration of relay 1050 of connector 51 disconnects ground potential from the lower winding of partially operated relay 1015 at contact 1054 and, as a consequence, relay 1015 operates fully over the circuit from ground on conductor 1088, contacts 1066, 1016, upper and lower windings of relay 1015 to battery. The full operation of relay 1015 switches conductor 1086 from contact 1013 to contact 1014, thereby causing a momentary break in the series circuit of relay 1850 of the register and the upper winding of relay 1010 of connector 51 but not of sufficient duration to cause the relays to restore. A voltage surge, however, is produced at the grid of Thyratron tube 1860 which causes tube 1860 to "flash" in well-known manner. The full operation of relay 1015 also switches the marking conductors associated respectively with marking contacts 1000, 1006, 1007, 1008, 1009 from the respective contacts 1029, 1027, 1025, 1023, 1021 to the respective contacts 1028, 1026, 1024, 1022, 1020 preparatory to marking the required line circuit in the EC bank associated with EC wiper 1095 of connector 51. At contact 1053, relay 1050 removes a multiple ground from the lower winding of relay 1010.

The restoration of relay 1040 of connector 51 occurs at approximately the same time as the mentioned restoration of relay 1050 and re-connects ground potential at contact 1041 to the lower winding of relay 1010 and the winding of relay 1830 in series, thereby maintaining relay 1010 operated and causing relay 1830 to re-operate. Re-operated relay 1830 is held in the operated position through its contact 1831 independent of contact 1851 of operated relay 1850. The flashing of Thyratron tube 1860 in the manner described in the preceding paragraph causes relay 1845 to re-operate from negative potential at the plate of tube 1860, contacts 1839, 1807, winding of relay 1845 to ground. At contact 1846, relay 1845 disconnects relay 1850 from conductor 1086 of connector 51, causing relay 1850 to restore and, at contact 1851, open one circuit path through the winding of re-operated relay 1830 but relay 1830 remains operated over the circuit path through its own contact 1831 and contact 1854 to conductor 1087 of connector 51 and then by way of the lower winding of relay 1010, contacts 1041, 1064 to ground. Relay 1010 is now maintained in the operated position through its lower winding as the upper winding of relay 1010 is open due to the disconnection of relay 1850 from conductor 1086 at contact 1846.

At contacts 1847, 1848, re-operated relay 1845 disables relay 1855, and relay 1855 restores. At contact 1856, restored relay 1855 opens the series circuit through the windings of relays 1840 and 1835, and both these relays restore. Relay 1835, however, re-operates from ground on conductor 846, contacts 1832, 1842, upper winding of relay 1835 to battery. The operating circuit of magnet 850 of the Out-Marking distributor is now re-completed from ground, contacts 1841, 1837, 1822, conductor 840, winding of magnet 850 to battery, causing magnet 850 to re-operate. At contact 1854, relay 1855 opens the series circuit through the windings of relays 1010 and 1830, and both these relays restore. Relay 1830, however, does not restore until after relay 1835 has re-operated in the manner just explained. At contact 1832, restored relay 1830 disables re-operated relay 1835, and relay 1835 again restores. At contact 1837, restored relay 1835 disconnects ground potential from operated magnet 850 of the Out-Marking distributor, thereby causing magnet 850 to restore and advance wipers 876, 866, 870 and 890 from the respective No. 5 bank contacts to the respective No. 6 bank contacts. As wiper 866 leaves its bank contact No. 5, wiper 865 of the fifth digit switch is disconnected from ground potential on conductors 867, 846, and, therefore, should relay 1825 have been operated as a result of the dialing of the fifth digit (if the fifth digit consisted of five or less impulses as previously explained), relay 1825 will now restore to normal.

In the meantime, while the wipers of the Out-Marking distributor are still resting on the respective No. 5 bank contacts, restored relay 1840 disables the grid circuit of tube 1860 at contact 1844. Also, at contact 1839, restored relay 1840 disables relay 1845 to cause its restoration and, at contact 1848, cause the re-operation of relay 1855 from ground, contact 839, conductor 869, wiper 890 of the Out-Marking distributor standing on the fifth contact of its bank, conductor 880, contacts 1848, 1857, winding of relay 1855 to battery. Re-operated relay 1855 locks to ground on conductor 846 by way of contacts 1858 and 1847. The register is now ready to mark the EC bank of the line circuit group 51 of connector 51 in accordance with the value of the fifth dialed digit, just before the wipers of the Out-Marking distributor pass from the No. 5 bank contacts to the No. 6 bank contacts.

(*p*) *Marking required line circuit in connector*

Should relay 1825 remain unoperated while the wipers of the Out-Marking distributor still remain on the No. 5 bank contacts, then re-operated relay 1855 connects relay 1850 to conductor 1086 of connector 51 by way of contacts 1826, 1853, 1846, conductor 765, wiper 705, contact 723, conductor 771, and contacts 912, 921 and wipers 951 of the first, second and third group selectors. From this point, the circuit of relay 1850 is extended to battery by way of conductor 1086 of connector 51, contacts 1013, 1012, 1070, 1018, and lower winding of relay 1030. Relay 1850 re-operates and relay 1030 of connector 51 operates. The operation of relay 1030 disconnects the first five contacts in each line circuit group of the EC bank of connector 51 at contacts 1032—1036, respectively, so that marking battery cannot thereafter be applied to any contact of the EC bank having a numerical value of five or less. Relay 1030 locks to ground potential on conductor 1088 by way of contacts 1031 and 1066. The re-operation of relay 1850 connects relay 1830 to conductor 1087 of connector 51 by way of contacts 1851, 1854, conductor 766, wiper 706, contact 729, conductor 772, and contacts 914, 923 and wipers 952 of the first, second and third group selectors. From this point, the circuit of relay 1830 is extended to ground by way of conductor 1087 of connector 51, lower winding of relay 1010 and contacts 1041, 1064. Relays 1830 and 1010 re-operate. Re-operated relay 1010 locks to ground on conductor 1086 from the winding of re-operated relay 1850, and opens the circuit to the lower winding of relay 1030 at contact 1012. Relay 1030, however, is locked in the operated position through its contact 1031 and cannot restore at this time. Relay 1830 causes relay 1835 to reoperate from ground on conductor 846, contacts 1832, 1842, winding of relay 1835 to battery. Relay 1835 completes a circuit to magnet 850 of the Out-Marking distributor from ground, contacts 1841, 1837, 1822, conductor 840, winding of magnet 850 to battery, causing magnet 850 to re-operate.

On the other hand, should relay 1825 re-operate at the stage of the register operation mentioned in the preceding paragraph, then re-operated relay 1855 connects relay 1830 to conductor 1087 of connector 51 by way of contacts 1827, 1854, conductor 766, wiper 706, contact 729, conductor 772 and contacts 914, 923 and wipers 952 of the first, second and third group selectors. From this point, the circuit of relay 1830 is extended to ground by way of conductor 1087 of connector 51, lower winding of relay 1010 and contacts 1041, 1064. Relays 1830 and 1010 re-operate. Re-operated relay 1830 causes relay 1835 to re-operate from ground on conductor 846, contacts 1832, 1842, winding relay 1835 to battery. At contact 1836, relay 1835 connects relay 1850 to conductor 1086 of connector 51 by way of contacts 1853, 1846, conductor 765, wiper 705, contact 723, conductor 771 and contacts 912, 921 and wipers 951 of the first, second, and third group selectors. Re-operated relay 1010 locks to ground from the winding of relay 1850 by way of contacts 1011 and 1013. Relay 1850 also re-operates over the just traced circuit. Relay 1030 of connector 51 is disabled at contact 1012 and cannot operate at this time and disconnect the first five contacts in each line circuit group of the EC bank of connector 51. Marking battery can, therefore, be subsequently applied to any contact of the EC bank having a numerical value of five or less. Re-operated relay 1835 also completes a circuit to magnet 850 of the Out-Marking distributor, from ground, contacts 1841, 1837, 1822, conductor 840, winding of magnet 850 to battery, causing magnet 850 to re-operate.

The non-reoperation or the re-operation of relay 1825 in the register as a consequence of the dialing of the fifth digit controls the sequence in which relays 1850 and 1830 are respectively connected to conductors 1086 and 1087 of connector 51, in order that relay 1030 of connector 51 will or will not be operated. In this manner, contacts of the EC bank having numerical value of five or less will or will not be subsequently marked with battery. In either event, both relays 1850 and 1830 are re-operated for the fourth time. At approximately this time, the wipers of the Out-Marking distributor are stopped from the respective No. 5 bank contacts to the respective No. 6 bank contacts, in the manner described in the preceding section "*o*" of the specification.

The fourth re-operations of both relays 1850 and 1830 complete a circuit to one of the frequency-connecting relays 1801—1805 from ground, contact 839, conductor 869, wiper 890 of the Out-Marking distributor standing on its No. 6 bank contacts, conductor 880, contacts 1848, 1859, 1852, 1833, conductor 877, wiper 876 of the Out-Marking distributor standing on its No. 6 bank contact, wiper 875 of the fifth digit switch, bank contact to which wiper 874 was advanced responsive to the dialing of the fifth digit, one of the conductors 881—885, one of the relays 1801—1805 to battery. The frequency-connecting relay selected by wiper 875 of the fifth digit switch accordingly operates and extends the corresponding frequency of F1—F5 through the primary winding of transformer 1800 to ground, thus again re-activating transformer 1800. A corresponding alternating current is accordingly induced into the secondary winding of transformer 1800.

This fifth development of alternating current in the secondary winding of transformer 1800 is extended to conductors 1086, 1087 of connector 51 by way of the battery-feed relay group and register-finder (Figure 7), the first group selector, the second group selector and the third group selector. The loop is completed from conductor 1087 of conductor 51 through the windings of the five magnets 1001—1005 in series, contact 1073, capacitator 1085, contacts 1011, 1013 to conductor 1086. The particular magnet tuned to the frequency of the current now flowing from the secondary winding of transformer 1800 accordingly vibrates its associated reed, thereby operating contacts 1001, 1006, 1007, 1008 or 1009, as the case may be.

Assuming for the moment that relay 1030 of the connector 51 was not operated as a consequence of the fifth digit dialing, then if contacts 1000 are operated, the first and sixth contacts (line circuits #1 and #6 respectively) of each of the five line circuit groups of the EC bank are marked with battery potential by way of contacts 1028, 1036: if contacts 1006 are operated then the second and seventh contacts (line circuits #2 and #7 respectively) of each of the five line circuit groups of the EC bank are marked with battery potential by way of contacts 1026, 1035: if contacts 1007 are operated then the third and eighth contacts (line circuits #3 and #8 respectively) of each of the five line circuit groups of the EC bank are marked with battery potential by way of contacts 1024, 1034: if contacts 1008 are operated, then the fourth and ninth contacts (line circuits #4 and #9 respectively) of each of the five line circuit groups of the EC bank are marked with battery potential by way of contacts 1022, 1033: and if contacts 1009 are operated, then the fifth and tenth contacts (line circuits #5 and #10 respectively) of each of the five line circuit groups of the EC bank are marked with battery potential by way of contacts 1020, 1032.

Should relay 1030 of connector 51, however, operate as a consequence of the fifth digit dialing, then the operation of contacts 1000 would mark only the sixth contacts of each of the five line circuit groups of the EC bank with battery potential by way of contact 1028; the operation of contacts 1006 would mark only the seventh contacts of each of the five line circuit groups of the EC bank with battery potential by way of contact 1026; the operation of contacts 1007 would mark only the eighth contacts of each of the five line circuit groups of the EC bank with battery potential by way of contact 1024; the operation of contacts 1008 would mark only the ninth contacts of each of the five line circuit groups of the EC bank with battery potential by way of contact 1022; and the operation of contacts 1009 would mark only the tenth contacts of each of the five line circuit groups of the EC bank with battery potential by way of contact 1020. In addition to the marking of contacts in each of the five line circuit groups of the EC bank, the operation of contacts 1000, 1006, 1007, 1008 or 1009 also causes the operation of relay 1050 of connector 51 by way of resistor A, one of the resistors B—F, resistor 1096, lower winding of relay 1050 to ground.

The stepping of the wipers of the Out-Marking distributor from the No. 5 contacts to the No. 6 contacts also completes a circuit for relay 1810 of the register from ground on conductors 846, 867, wiper 866 standing on its No. 6 bank contact, conductor 879, winding of relay

1810 to battery. Relay 1810 operates and locks to ground on conductor 846 by way of contact 1809. At contact 1808, relay 1810 prepares a point in the circuit of the upper winding of relay 1820.

(*q*) *Finding marked line circuit in connector*

Assuming now that contact 0 (line circuit #10) of line circuit group 51 of the EC bank of connector 51 is marked with battery potential in the manner previously described, EC wiper 1095 is standing on contact 51 of the EC bank, and relay 1050 has been operated through resistors 1096, B and A, then relays 1830, 1835, 1850, 1855, 1810, frequency-connecting relay 1805 and magnet 850 of the register, and magnet 1005, relays 1010, 1015, 1030 and 1050 of connector 51 are in the operated position. At contact 1052, relay 1050 prepares a point in the circuit of the upper winding of relay 1040: at contact 1053, connects a multiple ground to the lower winding of operated relay 1010: and, at contact 1049, completes a circuit from ground, contacts 1063, 1038, 1049, interrupter contact 1089, winding of magnet 1090 to battery. Magnet 1090 accordingly self-drives wipers 1091—1095 and 1091′—1094′ in well-known manner across the bank contacts of line circuit group 51.

As EC wiper 1095 contacts the mentioned bank contact 0, the battery potential on bank contact 0 is extended to ground by way of EC wiper 1095, contact 1052 and the upper winding of relay 1040, causing relay 1040 to operate. At contact 1038, relay 1040 opens the operating circuit of magnet 1090 to hold the wipers of connector 51 on their respective contacts corresponding to EC bank contact 0 of line circuit group 51. At contact 1041, relay 1040 disconnects ground potential from the lower winding of operated relay 1010, thereby causing relay 1830 of the register to restore. Relay 1010, however, remains operated through its upper winding. At contact 1039, relay 1040 prepares a point in the operating circuit of the upper winding of relay 1065.

At contact 1833, restored relay 1830 opens the circuit to the re-operated frequency-connecting relay 1805 thereby to disconnect frequency F–5 from the primary winding of transformer 1800. Magnet 1005 accordingly restores and disconnects marking battery from the upper winding of relay 1040 and the lower winding of relay 1050, causing both relays to restore. At contact 1832, relay 1830 disconnects ground potential from contact 1842 thereby causing relay 1840 to re-operate from ground on conductor 846, contact 1856, winding of relay 1840, contact 1838, winding of operated relay 1835 to battery. The just traced circuit also maintains relay 1835 in the operated position. At contact 1839, re-operated relay 1840 extends the upper winding of relay 1820 to the plate of tube 1860: at contact 1844, connects the grid circuit of tube 1860 to conductor 1086 of connector 51 by way of contacts 1853, 1846, conductor 765, wiper 705, contact 723, conductor 771, 941 and wipers 951 of the first, second and third group selectors; and, at contact 1841, disconnects ground potential from operated magnet 850 of the Out-Marking distributor thereby causing magnet 850 to restore and advance wipers 876, 866, 870 and 890 to the respective No. 7 bank contacts.

Assuming further that selected line circuit #10 is in prior use, then there will be ground potential on wiper 1093. This ground potential and the ground potential through contact 1039 form a short-circuit around the upper winding of relay 1065, and relay 1065 cannot operate at this time. Busy tone is, therefore, returned to calling station "A" in the manner described in the following paragraph.

At contact 1041, restored relay 1040 re-completes the circuit of restored relay 1830 from ground, contacts 1064, 1041, lower winding of relay 1010, conductor 1087, wipers 952 and contacts 923, 914 of the third, second and first group selectors, conductor 772, contact 729, wiper 706, conductor 766, contacts 1854, 1851, winding of relay 1830 to battery, causing relay 1830 to re-operate and lock to ground on conductor 1087 at contact 1831 independent of relay 1850. Re-operated relay 1830 completes a circuit from ground, winding of busy relay 745 (Figure 7), contact 724, wiper 707, conductor 767, contacts 1843, 1834, resistor 1829 to battery, causing busy relay 745 to operate. At contact 742, busy relay 745 disables the holding circuit of relay 720, causing relay 720 to restore and re-connect line relay 715 across line conductors 641—642 at contacts 725 and 727. Line relay 715 re-operates and establishes a locking circuit for busy relay 745 by way of contacts 743, 733, 716 and resistor 709. Busy tone relay 745 extends busy tone to the talking circuit of calling station "A" by way of contacts 744, 736, 725 and conductor 641. At contact 746, busy relay 745 disconnects guarding and holding ground from the occupied first, second and third group selectors and connector 51, thereby causing the restoration of the switching-through relays 910 of the first, second and third group selectors and the restoration of relays 1015 and 1030 of connector 51. The group selectors are now at normal and their wipers remain on the respective occupied bank contacts.

The restoration of relay 720 disconnects calling station "A" from the occupied register at contacts 726, 728, thereby opening the loop circuit of line relay 805 of the register and thus preparing the register for release: disconnects guarding ground from the register at contact 722: frees the register from the first group selector at contacts 723, 729; and disconnects the holding circuit of relay 710 from the register at contact 731 but relay 710 is now being held in the operated position from ground by way of contacts 753, 741 and 719. The restoration of the group selectors disable the circuits of the upper and lower windings of relay 1010 of connector 51. Connector 51 is now at normal and its wipers remain on the respective occupied bank contacts.

The calling station "A" upon hearing the busy tone, cradles the handset, thereby opening the loop circuit of line relay 715 and causing line relay 715 to restore. At contact 719, line relay 715 disables hold relay 710 and relay 710, at contact 711, removes the holding and guarding ground from conductor 643. The switches preceding the combined battery-feed relay group and register finder are thereby released in well-known manner. The restoration of hold relay 710 also frees the combined battery-feed relay group and register finder for use on a future call.

(*r*) *Switching through to seized line circuit*

Should line circuit #1 of line circuit group 51 be in free condition when tested by control wiper 1093 of connector 51, then relay 1065 operates over the circuit from ground, contacts 1063, 1039, 1044, upper winding of relay 1065, contact 1080, wiper 1093, bank contact connected to the C conductor of selected line circuit #10 (Figure 3–B), winding of cut-off relay 315 to battery. Cut-off relay 315 also operates over the circuit just traced, to clear line 305 of attachments. Relay 1065 locks to ground on conductor 1088 by way of contact 1068.

At contact 1063, relay 1065 removes ground potential to prevent any further operation of motor magnet 1090; at contact 1064, disconnects ground potential from contact 1041 of relay 1040; at contact 1066, disconnects ground potential to unlock and restore relays 1015 and 1030; at contact 1067, extends ground potential to cut-off relay 315 by way of wiper 1093 to maintain cut-off relay 315 operated and to guard line 305 against intrusion; at contact 1069 disconnects ground potential from contact 1017 to prevent a re-operation of relay 1015; at contact 1070, opens a point in the incomplete circuit of the upper winding of wiper-switching relay 1075; and, at contacts 1071 and 1074, completes the ringing circuit to line 305 by way of wipers 1091 and 1092.

The restoration of relay 1015 in the manner explained in the preceding paragraph switches conductor 1086 from contact 1014 to 1013, thereby causing a momentary break in the series circuit of relay 1850 and the upper winding of relay 1010 but not of sufficient duration to cause the relays to restore. A voltage surge, however, is produced at the grid of tube 1860 which causes tube 1860 to "flash" in well-known manner. The restoration of relay 1015 also switches the marking conductor associated respectively with marking contacts 1000, 1006, 1007, 1008 and 1009 from the respective contacts 1028, 1026, 1024, 1022, 1020 to the respective contacts 1029, 1027, 1025, 1023, 1021 to restore the line circuit marking conditions to normal in preparation for a future call.

The flashing of tube 1860 in the manner described in the preceding paragraph causes relay 1820 to operate from negative potential at the plate of tube 1860, contacts 1839, 1808, upper winding of relay 1820 to ground. Relay 1820 locks to ground on conductor 846 by way of contact 1821. At contact 1822, relay 1820 opens a point in the operating circuit of magnet 850 to prevent its re-operation. At contact 1823, relay 1820 completes a circuit from ground, conductor 768, wiper 708, contact 730, winding of relay 735 to battery. Relay 735 accordingly operates and locks to ground on conductor 643 by way of contact 738.

Relay 735 switches conductors 641, 642, 643 through to the respective conductors 1086, 1087, 1088 of connector 51 in the following manner. At contact 732, relay 735 opens the holding circuit of relay 720, causing relay 720 to restore; at contact 734, extends conductor 641 by way of contact 725, capacitator 748, contact 734, conductor 771, contacts 912, 921 and wiper 951 of the occupied first group selector, respective conductors, contacts and wipers of the occupied second and third group selectors to conductor 1086 of connector 51; at contact 737, extends conductor 642 by way of contact 727, capacitator 749, contact 737, conductor 772, contacts 914, 923 and wiper 952 of the occupied first group selector, respective conductors, contacts, and wipers of the occupied second and third group selectors to conductor 1087 of connector 51; and, at contact 739, extends conductor 643 independent of contact 746 of busy relay 745, by way of conductor 773, contacts 916, 925 and wiper 953 of the occupied first group selector, respective conductors, contacts and wipers of the occupied second and third group selectors to conductor 1088 of connector 51. At contact 737, relay 735 also extends the winding of meter relay 750 to conductor 1087 of connector 51 to prepare for the registration of the call. At contact 734, relay 735 also extends the winding of relay 745 to conductor 1086 of connector 51, causing relay 745 to operate through the upper winding of relay 1010.

The restoration of relay 720 re-connects line relay 715 across the line conductors 641, 642 at contacts 725 and 727, causing relay 715 to re-operate and supply talking battery to calling station "A" as long as station "A" remains on the connection. At contacts 726, 728, relay 720 disconnects calling station "A" from the occupied register, thereby opening the loop circuit of line relay 805 of the register and thus preparing the register for release; disconnects guarding ground from the register at contact 722; frees the register from the occupied first group selector at contacts 723, 729; and disconnects the holding circuit of relay 710 from the register at contacts 731 but relay 710 is now being held in the operated position from ground by way of contacts 753, 740, 718 and 712.

The talking circuit from calling station "A" is thus switched through to connector 51 in anticipation of the signalling of the called station and the subsequent answering thereof.

(*s*) *Signalling seized line circuit*

As explained in the preceding section "*r*" of the specification, the operation of relay 1065 of conductor 51 completes the ringing circuit to line 305 of called station "B" by way of contacts 1071, 1074 and wipers 1091, 1092. The ringing circuit may be traced from ground potential at contact 1062, contacts 1074, 1082, wiper 1092, bank contact connected to positive conductor of line 305, ringer of station "B," negative conductor of line 305, bank contact connected to negative conductor of line 305, wiper 1091, contacts 1078, 1071, 1058, upper winding of ringing cut-off relay 1055 to battery and generator. Relay 1055 cannot operate at this time due to the conventional capacitator in series with the ringer at station "B." Ringing current is accordingly transmitted to called station "B" in well known manner.

*(t) Called station answering call*

Responsive to the answering of the call at station "B," ringing cut-off relay 1055 of connector 51 operates in well-known manner to cut off the ringing current at contacts 1058 and 1062. Relay 1055 locks to ground on conductor 1088 by way of contact 1056. At contacts 1057 and 1061, relay 1055 extends the windings of relay 1050 to line 305 to provide talking battery to answering station "B," causing relay 1050 to re-operate. The talking circuit between calling station "A" and answering station "B" is completed by way of contacts 1059, 1060 and capacitors 1085, 1097.

At contact 1053, re-operated relay 1050 extends ground potential to the series circuit of the lower winding of relay 1010, conductor 1087, respective wipers, contacts and conductors of the occupied third, second and first group selectors, conductor 772, contact 737, winding of relay 750 to battery, causing relay 750 to operate. At contact 751, relay 750 connects a multiple ground to conductors 643, 773 to maintain holding and guarding circuits independent of contact 711: at contact 753 disables the circuit of the upper winding of relay 710 but relay 710 is of the slow-to-release type and, therefore, does not restore for a short time interval; and, at contact 752, completes the meter circuit of calling station "A" from ground, contacts 752, 713, conductor 644, wiper 634, contact 544, wiper 534, conductor 334, winding of meter 301 to battery, causing meter 301 to operate. Responsive to the delayed restoration of relay 710, meter 301 restores, thereby registering the call.

Conversation between stations "A" and "B" now takes place.

*(u) Calling station releases the established connection*

Upon the termination of the conversation, calling station "A" cradles the handset, thereby opening the loop circuit of line relay 715 (Figure 7) and causing relay 715 to restore. At contact 717, relay 715 removes ground potential from conductor 643, from conductors 773, 943 of the occupied first, second and third group selectors, and from conductor 1088 of connector 51. As a consequence, all relays in the established connection which were locked to ground potential supplied through contact 717 of line relay 715 are now restored to normal. The group selectors and connector switches associated with these relays are thus automatically at normal, since these switches have no fixed home positions and remain on the respective contacts last used. The group selectors and connector are later rotated to marked positions corresponding to a future call.

The cut-off relay 320 of station "A" restores to reconnect line relay 310 across line 300 in preparation for a future call, and cut-off relay 315 of station "B" restores (it being assumed that station "B" has also cradled the respective handset) to re-connect line relay 306 across line 305 in preparation for a future call.

Should station "B" abandon the established connection before station "A," release would be effected through the restoration of relay 750 responsive to the restoration of battery-feed relay 1050 of connector 51. At contact 751, relay 750 would remove ground potential from the control conductors of the switches in the established connection.

*(v) P. B. X line circuits*

Considering now the case where the selected line circuit is the first line circuit of a P. B. X unit of three line circuits as, for example, line circuit #1 represented by EC bank contact 1 of line circuit group 51, EC bank contact 2 representing the second line circuit of the P. B. X unit, and EC bank contact 3 representing the third line circuit of the P. B. X unit. The bank contacts of line circuit #1 which are accessible to wipers 1093 and 1094 respectively are strapped together as shown at the lower right-hand corner of Figure 10. The same is true of the related bank contacts of line circuit #2. The related bank contacts of line circuit #3 (the last line circuit in the P. B. X unit), however, are not strapped together but are independent of each other. The strapping of the bank contacts of line circuits #1 and #2 provides for automatic rotation of the wipers to the bank contacts of line circuit #3, should line circuits #1 and #2 test busy (in prior use), in the manner described in the following paragraphs.

Line circuit #1 (EC bank contact 1) is marked with battery potential, and EC wiper 1095 is stepped from EC bank contact 51 to bank contact 1 in a manner similar to that explained for line circuit #10 (EC bank contact 0). The battery potential on bank contact 1 is extended to ground by way of EC wiper 1095, contact 1052 and the upper winding of relay 1040, causing relay 1040 to operate. At contact 1038, relay 1040 opens the operating circuit of magnet 1090 to stop the wipers of connector 51 on their respective contacts corresponding to EC bank contact 1 of line circuit group 51. Should line circuit #1 be in prior use, then ground potential on wiper 1093 is extended by the strapping to wiper 1094 and thence through contact 1084 and the lower windings of relay 1045 and operated relay 1040 in series to battery. Relay 1045 operates and locks to ground on conductor 1088 by way of contacts 1047, 1066, and relay 1040 locks through its lower winding, contact 1042 and the lower winding of locked relay 1045. In the meantime, the operation of relay 1040 removed ground potential from the lower winding of relay 1010 at contact 1041, causing relay 1830 of the register to again restore and open the circuit of frequency-connecting relay 1801 to disconnect frequency F–1 from the primary winding of transformer 1800.

The disabling of transformer 1800 causes magnet 1001 of connector 51 to restore and remove the battery marking potential from EC bank contact 1 of the EC line circuit group 51. Relay 1050 accordingly restores and completes an operating circuit to magnet 1090 from ground, contacts 1043, 1037, 1048, interrupter contact 1089, winding of magnet 1090 to battery. Magnet 1090 operates, interrupts its circuit at contact 1089 and restores, thereby causing the wipers of connector 51 to advance to their respective bank contacts corresponding to the EC bank contact 2 of EC line circuit group 51.

Should line circuit #2 also be in prior use, then ground potential will be continued over wipers 1093, 1094 and contact 1084 to the lower windings of relays 1045 and 1040 in series, thereby to retain relay 1040 in its locked position, relay 1045 being locked through contact 1047 independent of its lower winding. The operating circuit to magnet 1090 is, therefore, maintained at contacts 1043, 1037, and magnet 1090 accordingly self-drives the wipers of connector 51 to their respective bank contacts corresponding to the EC bank contact 3 of EC line circuit group 51. Since the bank contacts of wipers 1093 and 1094 corresponding to line circuit #3 of the P. B. X unit are not strapped together, the wipers of connector 51 cannot now be advanced beyond the bank contacts of line circuit #3. Busy tone will, therefore, be returned to calling station "A" if line circuit #3 test busy (in prior use), or otherwise the connection will be completed to the called station in a manner similar to that previously explained for the call extended to line circuit #10. In this instance, however, the operating circuit for relay 1065 is completed from ground, contacts 1063, 1038, 1051, and 1046 to the upper winding of relay 1065, since relay 1045 remains locked until the termination of the connection and relay 1040 restored as wiper 1094 reached its respective bank contact corresponding to line circuit #3.

(*w*) *Restoring occupied register to normal*

When the connection from calling station "A" is switched through to seized line 305 of called station "B" on the banks of connector 51, the occupied register (Figures 8–A, 8–B and 8–C) is freed from the connection in the manner explained in section "*r*" of the specification. The loop circuit of line relay 805 is opened at contacts 726, 728, causing line relay 805 to restore for the final time. At contact 806, relay 805 disables relay 815, and relay 815 restores after a short interval.

At contact 816, restored relay 815 removes ground potential from the locking contacts of relays 891, 892, 893, 894, causing these relays to restore: at contact 817, removes ground potential from conductor 846 thereby to restore the relays of the register which are locked to conductor 846: at contact 818, removes ground potential from conductor 764; and, at contact 819, disconnects ground from conductor 761.

The restoration of relay 815 also completes a circuit from ground, contacts 807, 814, winding of relay 810, wiper 803 of the In-Dialing distributor standing on its continuous bank arc, interrupter contact 812, winding of magnet 800 to battery. Relay 810 accordingly operates and connects ground potential to conductor 761 at contact 811 to prevent possible premature seizure of the register. Magnet 800 self-drives the wipers of the In-Dialing distributor forward in well-known manner until wipers 801—804 reach the respective No. 1 (home) bank contacts, and the series circuit of the windings of relay 810 and magnet 800 is opened at the continuous bank arc of wiper 803. The In-Dialing distributor of the register is now at normal.

Relay 810 is of the slow-to-release type and, therefore, before relay 810 can restore, its circuit is recompleted from ground, contacts 807, 814, winding of relay 810, wiper 803 of the In-Dialing distributor standing on the No. 1 bank contact, conductor 830, wiper 851 of the first digit switch standing on its continuous bank arc, interrupter contact 847, winding of magnet 841 to battery. Relay 810 is, consequently, maintained in the operated position to further guard the register against seizure. Magnet 841 self-drives the wipers of the first digit switch forward in well-known manner until wipers 851, 861, 871 reach the respective No. 1 (home) bank contacts, and the series circuit of the windings of relay 810 and magnet 841 is opened at the continuous bank arc of wiper 851. The first digit switch is now at normal.

Before relay 810 can restore, its circuit is recompleted from ground, contacts 807, 814, winding of relay 810, wiper 803 of the restored In-Dialing distributor, conductor 830, wiper 851 of the restored first digit switch, wiper 852 of the second digit switch standing on its continuous bank arc, interrupter contact 848, winding of magnet 842 to battery. Relay 810 is consequently maintained in the operated position to further guard the register against seizure. Magnet 842 self-drives the wipers of the second digit switch in well-known manner until wipers 852, 862, 872 reach the respective No. 1 (home) bank contacts, and the series circuit of the winding of relay 810 and magnet 842 is opened at the continuous bank arc of wiper 852.

In like manner, the third digit switch, the fourth digit switch, the fifth digit switch and the Out-Marking distributor are successively restored to normal positions with the wipers coming to rest on the respective No. 1 bank contacts. The restoring of wiper 870 of the Out-Marking distributor to its No. 1 bank contact opens the series circuit through the windings of relay 810 and magnet 850 and, after a short interval, relay 810 restores. The restoration of relay 810 removes the last ground potential from conductor 761 at contact 811, and the register is thus freed for use on a future call.

(*x*) *Calls through lower sets of wipers of group selectors and calls through other trunk groups of group selectors and connectors*

It should be understood at this time that while an explanation has been given in the preceeding sections of the specification of a call utilizing only the upper sets of wipers of the group selectors and the connector, calls can be equally as well routed through the respective lower sets of wipers, or any required combination of upper and lower sets of wipers.

It should be further understod that in like manner calls can be routed through any of the trunk groups 11—10, 21—20, 31—30 and 41—40 of the first, second and third group selectors and line circuit groups 11, 21, 31 and 41 of the connectors, according to circumstance.

OUTGOING CALL FROM MAIN OFFICE TO BRANCH OFFICE

A call from the main office of the telephone system to a station in the branch office of the telephone system is completed in the same manner as that described in the preceding sections of the specification for a local call in the main office, as far as the calling and called stations are concerned.

The trunking arrangement, however, differs in the inclusion of an incoming trunk-holding group, such as 200, between the main office first group selector (116—117) and the branch office incoming second group selector (205—206), as shown in Figures 1 and 2 of the drawings.

Since the incoming second group selector, the third group selector and the connector shown in Figure 2 for the branch office are counterparts, respectively, of the second group selector, the third group selector and the connector shown in Figure 1 for the main office, it is considered unnecessary to repeat the operation of these switches in connection with the description of a main office to branch office call. The description in this section is, therefore, limited to an explanation of the operation of the incoming trunk-holding group 200, it being understood that reference can be had to the preceding sections of the specification for detail explanations of the operations of the other switches in the branch office.

Assuming now that station "A" has initiated a call for station "B" and that station "A" is located in the main office and station "B" (215) in the branch office, and that station "A" has caused the operation of the first group selector 116—117 to select the trunk outlet extending to incoming trunk-holding group 200, all in the manner explained in the preceding sections of the specification, then either the upper set of wipers or the lower set of wipers of the incoming second group selector (Figure 9) is selected according to the value of the second dialed digit. The wiring of incoming trunk-holding group 200 is shown in Figure 11, with conductors 1101, 1102 connected respectively to bank contacts accessible to wipers 951, 952 of the first group selector 116—117, and conductors 1121, 1122, 1123 connected respectively to conductors 771, 772, 773 of the third group selector 207—208.

Assuming further that the upper set of wipers of the incoming second group selector 205—206 is selected, then relay 115 of the incoming trunk-holding group 200 operates in series with the lower winding of relay 930 of the incoming second group selector 205—206 from the negative battery potential supplied through the winding of relay 1830 of the main office register 115 (Figures 8–A, 8–B, 8–C) over conductor 1102. At contact 1116, relay 1115 completes an obvious circuit to relay 1120, causing relay 1120 to operate. At contact 1123, relay 1120 extends ground potential to conductor 773 of the incoming second group selector 205—206 to provide holding and guarding ground potential for the incoming second group selector 205—206.

Relay 930 of the incoming second group selector 205—206 locks to ground over conductor 1101 through the windings of relay 1850 of the main office register and relay 1110 of the incoming trunk-holding group 200, causing both relays 1850 and 1110 to operate. At contact 1109, relay 1110 connects a multiple ground to the winding of relay 1120. The balance of the operation of the connection between stations "A" and "B" is the same as that described in the preceding sections of the specification, capacitators 1103 and 1104 completing the talking circuit between the two stations at the incoming trunk-holding group 200, and the windings of relays 1110 and 1115 providing the circuit continuity for the supervisory and releasing operations.

Upon abandonment of the connection, the three relays of incoming trunk-holding group 200 are restored, and the holding and guarding grounds for incoming second group selector 205—206, third group selector 207—208 and connector 209—210 are disabled at contact 1123 of relay 1120. These three switches and the cut-off relay of called station "B" are accordingly released to restore the branch office apparatus to normal.

Should the re-operation of relays 1830 and 1850 of the main office register be reversed in connection with the seizing of incoming second group selector 205—206 in the branch office, i. e., should relay 1850 re-operate before relay 1830, then the lower set of wipers of incoming second group selector 205—206 would be selected and relay 1110 of incoming trunk-holding group 200 would operate before relay 1115.

Having described the invention, what is considered new and is desired to have protection by Letters Patent is set forth in the following claims.

What is claimed is:

1. The combination with a connecting switch having incoming conductors, having a set of wipers and contact banks including a pair of line wipers and banks and a marking wiper and bank, each of said sets of banks including a plurality of groups of bank contacts, and having means for rotating said wipers over said bank contacts, of a source of potential, a plurality of tuned elements connected to said incoming conductors for responding to alternating currents receivable over said incoming conductors, each said tuned element being tuned to be responsive to a different frequency of alternating current, means controllable by each said tuned element when the corresponding alternating current frequency is received over said incoming conductors for connecting said potential to a different group of said groups of contacts in said marking bank according to the value of the alternating current frequency to which said tuned element is tuned, thereby to mark said group, means actuated by the marking of any one group of said groups of bank contacts for controlling said rotating means so as to rotate said wipers over said groups of bank contacts to said last mentioned one marked group and means for extending a connection from said incoming conductors over said pair of line wipers to a pair of line bank contacts in the last-mentioned group.

2. The combination as claimed in claim 1 wherein each said tuned element includes a vibrating reed, each said reed being tuned to be responsive to a different frequency of alternating current.

3. The combination with a connecting switch having incoming conductors, having a set of wipers and contact banks including a pair of line wipers and banks and a marking wiper and bank, each of said sets of banks including a plurality of primary and secondary groups of bank contacts, and having means for rotating said wipers over said bank contacts, of a source of potential, a plurality of tuned elements connected to said incoming conductors for responding to alternating currents receivable over said incoming conductors, said tuned elements being tuned to be responsive to different frequencies of alternating currents, means controlled by one of said tuned elements responding to the transmission of an alternating current, of the frequency to which said one tuned element is tuned, over said incoming conductors for connecting said potential to one group of said primary groups of contacts in said marking bank, thereby to mark said one primary group, means responsive to said marking of said one primary group of bank contacts for controlling said rotating means so as to rotate said wipers over said primary groups of bank contacts to said one marked primary group, means controlled by one of said tuned elements responding to a subsequent transmission of an alternating current, of the frequency to which said tuned element is tuned, over said incoming conductors for connecting said potential to one of said secondary groups of contacts in said marking bank, thereby to mark said secondary group, means responsive to said marking of said secondary group of bank contacts for controlling said rotary means so as to rotate said wipers over said bank contacts of said secondary groups to a bank contact of said marked secondary group and means for extending a connection from said incoming conductors over said pair of line wipers to a pair of line bank contacts in the last-mentioned group.

4. In a telephone system, a register, connections incoming to said register, a connecting switch having a set of wipers and contact banks, talking conductors interposed between said register and said switch, alternating current responsive means associated with said switch and connected to said conductors, said register comprising means for generating different alternating current signals, recording means set under the control of a digital impulse series received over said incoming connections for selecting said generating means in accordance with the numerical value of said digit and means controlled by said recording means for connecting to said conductors alternating current derived from the selected generating means, said alternating current responsive means being operative in response to the receipt from said register of the selected alternating current signal to apply an electrical marking to a contact bank of said switch, and means associated with said switch and responsive to said marking to correspondingly position the wipers of said switch, thereby to selectively extend said conductors.

5. In a telephone system, the combination as defined in claim 4, wherein said connecting switch is a single motion stepping switch of the non-homing type.

6. In a telephone system, a register, connections incoming to said register, a connecting switch having a set of wipers and contact banks, talking conductors interposed between said register and said switch, frequency responsive means associated with said switch and connected to said conductors, said register comprising a number of alternating current sources each of a different frequency, recording means set under the control of a digital impulse series received over said incoming connections for selecting a given single one of said alternating current sources in accordance with the numerical value of said digit and means controlled by said recording means for connecting to said conductors alternating current derived from said selected source, said frequency responsive means being operative in response to the receipt from said register of alternating current of the selected frequency to apply an electrical marking to a contact bank of said switch, and means associated with said switch and responsive to said marking to correspondingly position the wipers of said switch, thereby to selectively extend said conductors.

7. In a telephone system, the combination as defined in claim 6, wherein said frequency responsive means include a plurality of vibrating reeds, one for each of said frequencies.

8. In a telephone system, a register, connections incoming to said register, a switch having a set of wipers and contact banks, said contacts being divided into two groups, trunk connections interposed between said register and said switch, direct current responsive means and frequency responsive means both associated with said switch and connected to said trunk connections, said register comprising five alternating current sources each of a different frequency, recording means set under the control of a digital impulse series received over said incoming connections for selecting one of said alternating current sources in accordance with the numerical value of said digit and means controlled by said recording means for transmitting a group discriminating direct current signal in accordance with the setting of said recording means and connecting to said trunk connections alternating current derived from said selected source, said direct current and frequency responsive means being effective in response to the receipt from said register of said direct current signal and said alternating current of selected frequency respectively to select one of said two groups of contacts and apply an electrical marking to a contact bank of said switch thereby to effect a selection within said group, and means associated with said switch and responsive to said marking to accordingly position the switch wipers.

9. In a telephone system, the combination as defined in claim 8, wherein the five frequencies generated by said source are harmonic frequencies.

10. In a telephone system, a first office, a register in said office, connections incoming to said register, a second office, a connecting switch in said second office having a set of wipers and contact banks, an interoffice trunk interposed between said register and said switch, said trunk comprising a pair of talking conductors only, direct current responsive means and frequency responsive means both associated with said switch and connected to said trunk; said register comprising a number of alternating current sources each of a different frequency, recording means set under the control of a digital impulse series received over said incoming connections for selecting one of said alternating current sources in accordance with the numerical value of the said digit and means controlled by said recording means for causing a direct current energization of said trunk upon seizure and for connecting to said trunk alternating current derived from the source selected by said recording means; said frequency responsive means being effective in response to the receipt from said register of said alternating current of selected frequency to apply an electrical marking to a contact bank of said switch, and means associated with said switch and responsive to said marking to correspondingly position the wipers of said switch, thereby to selectively extend the connection over said wipers, said direct current responsive means being effective in response to the direct current deenergization of said trunk in said first office at the end of the call to release the connection in said second office.

11. In a telephone system, a first office, a register in said office, connections incoming to said register, a second office, a connecting switch in said second office having a set of wipers and contact banks, an interoffice trunk interposed between said register and said switch, said trunk comprising a pair of talking conductors only, direct current responsive means and frequency responsive means both associated with said switch and connected to said trunk; said register comprising a number of alternating current sources each of a different frequency, recording means set under the control of a digital impulse series received over said incoming connection for selecting one of said alternating current sources in accordance with the numerical value of said digit and means controlled by said recording means for causing a direct current energization of said trunk upon seizure and means operative only upon said direct current energization becoming effective for connecting to said trunk alternating current derived from the source selected by said recording means; said frequency responsive means being effective in response to the receipt from said register of said alternating current of selected frequency to apply an electrical marking to a contact bank of said switch, and means associated with said switch and responsive to said marking to correspondingly position the wipers of said switch, thereby to selectively extend the connection over said wipers, said direct current responsive means being effective in response to the direct current deenergization of said trunk in said first office at the end of the call to release the connection in said second office.

12. In a telephone system, a first office, a register in said office, connections incoming to said register, a second office, a connecting switch in said second office having a set of wipers and contact banks, said contacts being divided into two groups, an interoffice trunk interposed between said register and said switch, said trunk comprising a pair of talking conductors only, direct current responsive means and frequency responsive means both associated with said switch and connected to said trunk; said register comprising a number of alternating current sources each of a different frequency, recording means set under the control of a digital impulse series received over said incoming connections for selecting one of said alternating current sources in accordance with the numerical value of said digit and means controlled by said recording means for causing a direct current energization of the trunk upon seizure in a predetermined way depending on the setting of said recording means and for connecting to said trunk alternating current derived from said selected source, said direct current and frequency responsive means being effective in response to said predetermined direct current energization and to the receipt from said register of said alternating current of selected frequency respectively to select one of said two groups and apply an electrical marking to the contact bank of said switch to effect a selection within said group, and means associated with said switch and responsive to said marking to accordingly position the switch wipers, thereby to selectively extend the connection, said direct current responsive means being effective in response to the direct current deenergization of said trunk in said first office at the end of the call to release the connection in said second office.

13. In a telephone system, a register device, connections incoming to said device, a switch train comprising a series of directively controlled connecting switches, each switch having associated therewith a pair of incoming talking conductors and frequency responsive means connected to said conductors; said register device having access to the conductors incoming to the first switch of said train and comprising a number of alternating current sources each of a different frequency, a plurality of recording means sequentially set under the control of a plurality of digital impulse series received over said incoming connections for selecting said alternating current sources in accordance with the numerical value of said digits and means controlled by said recording means for transmitting a sequence of signal codes over said last-mentioned conductors, each of said signal codes comprising the connection to said conductors of alternating current derived from one of said sources as selected by said means; and the frequency responsive means of each switch being directly responsive to the receipt from said register device of alternating current of the respective frequency within said sequence to control the associated switch in selectively extending said conductors beyond said switch.

14. In a telephone system, the combination as defined in claim 13 wherein said connecting switch is of the single-motion stepping type.

15. In a telephone system, the combination as defined in claim 13, wherein the four frequencies generated by said source are harmonic frequencies.

16. In a telephone system, the combination as defined in claim 13 wherein said register device comprises means operative in response to the receipt of the impulse series corresponding to the second digit for initiating the transmission of a signal code corresponding to the first digit.

17. In a telephone system, a register device, connections incoming to said device, a switch train comprising a series of directively controlled connecting switches, each switch having associated therewith a pair of incoming talking conductors and direct current responsive means and frequency responsive means both connected to said conductors; said register device having access to the conductors incoming to the first switch of said train and comprising a number of alternating current sources each of a different frequency, a plurality of recording means successively set under the control of a plurality of digital impulse series received over said incoming connections for selecting said alternating current sources in accordance with the numerical value of said digits and means controlled by said recording means for transmitting a sequence of signal codes over said last-mentioned conductors, each of said signal codes comprising the transmission of a direct current signal in accordance with the setting of said recording means and the connection to said conductors of alternating current from one of said sources as selected by said means; and each switch of said train being set under the joint control of its associated direct current and frequency responsive means in response to the respective signal code within said sequence transmitted by said register device to selectively extend said conductors beyond said switch.

18. In a telephone system, a code sender, a switch train comprising a series of directively controlled connecting switches of the single-motion stepping type each having a set of wipers and contact banks and each switch having associated therewith a pair of incoming talking conductors and alternating current responsive means connected to said conductors; said code sender having access to the talking conductors incoming to the first switch of the train and comprising a plurality of recording means effective in response to the impression thereon of a multi-digit numerical designation to select one of a plurality of alternating current signal codes and means controlled by said recording means for transmitting a sequence of said signal codes over said last-mentioned conductors; the alternating current responsive means of each switch being directly responsive to the receipt from said code sender of the respective signal code within said sequence to apply an electrical marking to a contact bank of said switch, and means associated with said switch and responsive to said marking to correspondingly position the wipers of said switch and cause said talking conductors to be extended over the wipers of said switch.

19. In a telephone system, a code sender, a switch train comprising a series of directively controlled connecting switches each switch having associated therewith a pair of incoming talking conductors and frequency responsive means connected to said conductors; said code sender having access to the talking conductors incoming to the first switch of the train and comprising a number of alternating current sources each of a different frequency, a plurality of recording means effective in response to the impression thereon of a multi-digit numerical designation to select said alternating current sources in accordance with the numerical values of said digits and means for transmitting a sequence of signal codes over said last-mentioned conductors, each of said signal codes comprising the connection to said talking conductors of alternating current derived from one of said sources as selected by said recording means; the frequency responsive means of each switch being directly responsive to the receipt from said code sender of alternating current of the respective frequency within said sequence to apply an electrical marking to said switch and means associated with said switch and responsive to said marking to correspondingly position said switch and cause said talking conductors to be extended thereover.

20. In a telephone system, a code sender, a switch train comprising a series of connecting switches of the single-motion type each having a set of wipers and contact banks, said contacts being divided into two groups, and each switch having associated therewith a set of incoming talking conductors and direct current responsive means and frequency responsive means both connected to said conductors; said code sender having access to the talking conductors incoming to the first switch of the train and comprising five alternating current sources each of a different frequency, a plurality of recording means effective in response to the impression thereon of a multi-digit numerical designation to select said alternating current sources in accordance with the numerical values of said digits, and means for transmitting a sequence of signal codes over said last-mentioned conductors, each of said signal codes comprising the transmission of a direct current signal in accordance with the setting of said recording means and the connection to said conductors of alternating current derived from one of said sources as selected by said means; the direct current and frequency responsive means of each switch being effective in response to the receipt from said code sender of the corresponding signal code within said sequence to respectively select one of said groups of contacts and apply an electrical marking to a contact bank of said switch to effect a selection within said group, and means associated with said switch and responsive to said marking to accordingly position the switch wipers and cause said conductors to be extended over said wipers.

21. In a telephone system, the combination as defined in claim 20, wherein the five frequencies generated by said sources are harmonic frequencies.

22. In a telephone system, a sender, a switch train comprising a series of directively controlled connecting switches each having a set of wipers and contact banks and each switch having associated therewith a pair of incoming talking conductors and alternating current responsive means connected to said conductors; said sender having access to the talking conductors incoming to the first switch of said train and comprising means for generating different alternating current signals, a plurality of recording means each effective in response to the impression thereon of a multi-digit numerical designation to select said generating means in accordance with the numerical values of said digits and means for sequentially transmitting sets of signals over the last-mentioned conductors, each of said sets of signals comprising the direct current energization of said last-mentioned conductors and the connection to said conductors of alternating current derived from the generating means selected by said recording means; the alternating current responsive means of each switch being directly responsive to the receipt from said sender of the respective alternating current signal within said sequence to apply an electrical marking to the contact bank of said switch, said switch also having associated therewith means responsive to said marking for positioning said switch on a corresponding group of contacts in said bank and effecting a change in the direct current energization of the talking conductors incoming thereto, and said sender having associated therewith means responsive to said change for preparing said sender for the transmission of the next set of signals in said sequence.

23. In a telephone system, the combination as defined in claim 22, wherein the means last-mentioned in claim 22 include a relay responsive to said change for disconnecting from said conductor said alternating current and preparing said sender for the connection of the next alternating current signal in said sequence.

24. In a telephone system, the combination as defined in claim 22, wherein at least the first switch of said train is a selector; wherein the means last-mentioned in claim 22 are responsive to said change in direct current energization for preparing said sender for the receipt of a further revertive signal; and wherein said sender has means responsive to a predetermined revertive signal subsequently received from said selector in a free outlet in the selected group has been found for initiating the transmission by said sender of the next set of signals in said sequence.

25. In a telephone system, the combination as defined in claim 24, wherein each of said switches has line relay means operated in a direct current circuit extending over said talking conductors upon seizure of said switch, wherein the means last-mentioned in claim 24 include an electronic discharge device connected to one of said talking conductors, and wherein said selector has a switching relay operative upon a free outlet in the selected group having been found to disconnect said conductor from the line relay means of said selector at a break contact and switch said conductor through to the line relay means of the succeeding switch at a make contact, said discharge device being responsive to the surge produced by the momentary opening of said direct current circuit during the travel of said contacts for initiating the transmission by said sender of the next set of signals in said sequence.

26. In a telephone system, the combination as defined in claim 24, wherein said sender also has means responsive to another predetermined signal received from said selector if all outlets in the selected group have been found busy for causing said selector to be released and a busy signal to be returned to the calling end of the connection.

27. In a telephone system, the combination as defined in claim 22, wherein at least the first switch of said train is a selector; that the means last-mentioned in claim 22 are responsive to said change in direct current energization for preparing said sender for the receipt of a further signal; and wherein said sender has means responsive to a predetermined revertive signal subsequently received from said selector if a free outlet in the selected group has been found for initiating the transmission by said sender of the next set of signals in said sequence, and responsive to said direct current energization being changed back to its first state in said selector if all outlets in the selected group have been found busy for causing the release of said selector.

28. In a telephone system, a sender, a switch train comprising a series of directively controlled connecting switches each having a set of wipers and contact banks, said contacts being divided into two groups and each switch having associated therewith a pair of incoming talking conductors and direct current responsive means and alternating current responsive means both connected to said conductors; said sender having access to the talking conductors incoming to the first switch of said train and comprising means for generating different alternating current signals, a plurality of recording means set in response to the impression thereon of a multi-digit numerical designation to select said generating means in accordance with the numerical values of said digits and means for sequentially transmitting sets of signals over the last-mentioned conductors, each of said sets of signals comprising the direct current energization of said last-mentioned conductors in a predetermined way depending on the setting of said recording means and the connection to said conductors of alternating current derived from the generating means selected by said recording means; the direct current and alternating current responsive means of each switch being responsive to the receipt from said sender of the corresponding set of signals within said sequence to respectively select one of said two groups and apply an electrical marking to a contact back of said switch thereby to effect a selection within said group, said switch also having associated therewith means responsive to said marking for correspondingly positioning the wipers of said switch and effecting a change in the direct current energization of the talking conductors incoming thereto, and said sender having associated therewith means responsive to said change for preparing said sender for the transmission of the next set of signals in said sequence.

29. A signaling arrangement for automatic telephone systems, comprising a trunk, an electronic discharge device at one end of said trunk and having a control electrode connected to a conductor of said trunk, a signal receiving relay associated with said discharge device, a signalling relay at the other end of said trunk and having a break and a make contact, one side of each of these contacts being connected to said conductor and the other side of the two contacts being respectively connected to two circuit branches having substantially the same direct current potential applied thereto, fast-acting relay means also connected to the first-mentioned end of said conductor and energized in a direct current circuit extending over said conductor, one of said two contacts and the corresponding circuit branch, said signaling relay being operative responsive to a control impressed on its winding to rapidly switch said conductors at said contacts from one of said circuit branches to the other without changing the condition of said fast-acting relay means, and said discharge device being operative in response to the surge produced by the momentary opening of said direct current circuit during the travel of said contacts to change the condition of said signal receiving relay.

References Cited in the file of this patent

UNITED STATES PATENTS

| | | |
|---|---|---|
| 2,257,568 | Mathies | Sept. 30, 1941 |
| 2,407,150 | Gillings | Sept. 3, 1946 |
| 2,454,809 | Kruithof | Nov. 30, 1948 |
| 2,529,166 | Lesigne | Nov. 7, 1950 |
| 2,547,043 | Pouliart | Apr. 3, 1951 |
| 2,580,095 | Holden | Dec. 25, 1951 |
| 2,581,457 | Theillaumas | Jan. 8, 1952 |